United States Patent
Ishimoto

(10) Patent No.: US 7,835,236 B2
(45) Date of Patent: Nov. 16, 2010

(54) SERVO CONTROL APPARATUS AND METHOD, AND DISK RECORDING OR PLAYBACK APPARATUS

(75) Inventor: Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 588 days.

(21) Appl. No.: 11/887,751

(22) PCT Filed: Mar. 27, 2006

(86) PCT No.: PCT/JP2006/306162

§ 371 (c)(1),
(2), (4) Date: Oct. 3, 2007

(87) PCT Pub. No.: WO2006/109557

PCT Pub. Date: Oct. 19, 2006

(65) Prior Publication Data

US 2009/0059741 A1    Mar. 5, 2009

(30) Foreign Application Priority Data

Apr. 6, 2005   (JP) .............................. 2005-110151

(51) Int. Cl.
*G11B 7/00* (2006.01)
(52) U.S. Cl. ................................. 369/44.35; 369/53.28
(58) Field of Classification Search ........................ None
See application file for complete search history.

(56) References Cited

U.S. PATENT DOCUMENTS 4,412,161 A * 10/1983 Cornaby ..................... 318/561
5,684,650 A * 11/1997 Kadlec et al. ............ 360/77.06

FOREIGN PATENT DOCUMENTS

| JP | 1-173103 | 7/1989 |
| JP | 5-268105 | 10/1993 |
| JP | 05-268105 A | 10/1993 |
| JP | 2001-126421 A | 5/2001 |
| JP | 2002-358125 A | 12/2002 |
| WO | WO 03/009290 A1 | 1/2003 |

* cited by examiner

*Primary Examiner*—Paul Huber
(74) *Attorney, Agent, or Firm*—Wolf, Greenfield & Sacks, P.C.

(57) ABSTRACT

There is provided a servo controller that can automatically set a filter intended for stabilizing a closed loop. The servo controller includes a repetitive controller. The repetitive controller implements repetitive control of a servo error signal (observation signal y(t)) by producing, by an adaptive line spectrum enhancer or adaptive linear prediction unit, a second error signal (including mainly a rotational sync signal) resulted from reduction of an irrotational sync component from a first error signal resulted from subtraction of the observation signal y(t) from a target signal r(t) and producing a third error signal obtained by sequentially updating the first error signal while making one-period delay of the second error signal.

16 Claims, 28 Drawing Sheets

SERVO CONTROL APPARATUS AND METHOD, AND DISK RECORDING OR PLAYBACK APPARATUS

TECHNICAL FIELD

The present invention relates to a servo control apparatus and method suitable for use in a focus servo mechanism and tracking servo mechanism in a biaxial actuator of an optical head or in a gap servo mechanism in a biaxial actuator of an optical head used in a near field in an optical disk recording apparatus that records information to a disk-shaped recording medium such as an optical disk, magneto-optical disk or the like and an optical disk playback apparatus that reproduces information recorded in such a disk-shaped recording medium. The present invention also relates to an optical disk recording or playback apparatus in which the servo control apparatus and method according to the present invention are applied to a focus servo mechanism and tracking servo mechanism in a biaxial actuator of an optical head or to a gap servo mechanism in a biaxial actuator of an optical head used in a near field.

This application claims the priority of the Japanese Patent Application No. 2005-110151 filed in the Japanese Patent Office on Apr. 6, 2005, the entirety of which is incorporated by reference herein.

BACKGROUND ART

Of the recording media, an optical disk removably settable in a recording and/or playback apparatus can be rotated together with a turntable included in a disk rotation drive mechanism with the central portion thereof being clamped to the turntable when used in the recording and/or playback apparatus. The optical disk rotated with the central portion thereof being clamped to the turntable is likely to incur the so-called "axial runout". That is, it deflects axially about its clamped central portion while being rotated.

If the optical disk set in the recording and/or playback apparatus axially runs out while being rotated by the disk rotation drive mechanism, mainly a focus error is likely to occur during recording or reproduction of information.

Therefore, the optical disk removably settable in the recording and/or playback apparatus should desirably be mounted horizontally on the turntable without tilting when it is clamped to the turntable, but it is difficult to place and clamp the optical disk precisely horizontally on the turntable.

Such being the case, the focus servo mechanism provided in the optical disk recording and/or playback apparatus using a removable optical disk as a recording medium is addressed to some axial runout the optical disk set in the apparatus will possibly incur while being rotated by the disk rotation drive mechanism. For DVD (Digital Versatile Disk) for example, the focus servo mechanism of the recording and/or playback apparatus is so designed that even an axial runout of ±300 μm in relation to the plane of disk rotation will not cause any focus error.

These days, it has been proposed to utilize evanescent light in an apparatus that records or reproduces predetermined information to or from an optical recording medium such as an optical disk by irradiating a light beam in order to enable recording or reproduction with a high density beyond the limit of light diffraction.

For utilizing evanescent light to record information to an optical recording medium and/or reproduce information recorded in an optical recording medium, it has been proposed to use an SIL (Solid Immersion Lens) for emission of the evanescent light.

To record or reproduce information to or from an optical recording medium with the use of the evanescent light, a two-group lens which is a combination of an SIL and aspheric lens and of which the numerical aperture (NA) is more than one (1) should be used as an optical system that condenses a light beam for irradiation to the optical recording medium in order to reduce the distance between the light-outgoing surface of the optical system and information recording surface of the optical recording medium to less than a half of the wavelength $\lambda$ of the light beam incident upon the SIL. For example, in case the wavelength $\lambda$ of the light beam is 400 nm, the above distance should be less than 200 nm.

For quality recording or reproduction, the distance between the light-outgoing surface of the focusing optical system and information recording surface of the optical recording medium should be kept constant. On this account, there is disclosed in the Japanese Published Unexamined Patent Application No. 2001-76358 (Patent Document 1) a technology in which in an optical head including an SIL, a difference between return light from the optical recording medium is utilized as an error signal to control the position of the focusing optical system in relation to the optical recording medium by driving and controlling the actuator of the optical head correspondingly to the error signal.

For implementing the quality recording and reproduction with the use of evanescent light, it is necessary to have the optical head follow the information recording surface of the recording medium while controlling the distance between the light-outgoing surface of the focusing optical system and information recording surface of the optical recording medium at extremely short intervals of nano meters.

Also, the disk-shaped recording medium itself incurs some radial runout which will prevent the actuator of the optical head from accurately following a beam spot. Therefore, the tracking should be servo-controlled by a tracking servo mechanism.

In the past, in the tracking servo control made in a tracking servo controller and focus servo control made in a focus servo controller, a tracking error signal and focus error signal influenced by disturbances such as axial runout and radial runout have been detected, servo error signals free from the influences of the disturbances have been extracted from the detected tracking and focus error signals and the tracking and focus servo mechanisms have been controlled until the servo error signals become zero.

Also, the servo error signal has been stored in a memory and an error signal stored in the memory has been used to suppress the disturbance components included in the servo error signal. In this case, the control system is a dead-time one, and a strictly proper control system having numerous poles on an imaginary axis will not be able to stabilize any closed-loop system if it is left as it is. On this account, the error signal is passed through a filter before being stored in the memory, not stored as it is into the memory, to stabilize the closed-loop system.

In the past, however, the multiplication factor of the filter intended to stabilize the closed-loop system has been artificially selected by try and error to meet conditions for the stability. Therefore, designing the filter has taken much time, the filter performance has depended upon the designer, and the quality of servo control has not been constant.

DISCLOSURE OF THE INVENTION

It is therefore desirable to overcome the above-mentioned drawbacks of the related art by providing a servo control apparatus and method capable of automatically setting the filter adaptively to a servo error signal. Also, it is desirable to provide a servo control apparatus and method capable of high-precision servo control.

It is also desirable to provide an optical disk recording or playback apparatus that can be servo-controlled for a constant quality of servo control.

According an embodiment of the present invention, there is provided a servo control apparatus including a repetitive control unit that determines a first error signal on the basis of a target signal and a signal of observation of a controlled object having a disturbance applied thereto, makes adaptive line spectrum enhancement or adaptive linear prediction of the first error signal to provide a second error signal, delays the second error signal by one period, generates an adaptive disturbance signal by repetitive control using the delayed second error signal and outputs a third error signal resulted from addition of the disturbance signal thus generated to the first error signal, the repetitive control unit controlling a servo mechanism which is the controlled object on the basis of the third error signal resulted from the repetitive control.

Therefore, the above servo control apparatus can generate, by the adaptive line spectrum enhancement or adaptive linear prediction, the error signal mainly from a rotational sync signal component resulted from reduction of an irrotational sync signal component from a servo error. Also, the repetitive control can be implemented by storing the error signal in a delay unit having a capacity for one period and sequentially updating the error signal in the delay memory.

In the above servo control apparatus, the repetitive control unit includes a first error signal detector that determines a first error signal on the basis of the target signal and observation signal; an adaptive filter unit that makes the adaptive line spectrum enhancement or adaptive linear prediction of the first error signal detected by the first error signal detector to provide a second error signal; a delay unit that delays the second error signal from the adaptive filter by one period; a feed-back unit that feeds the second error signal taken out of the delay unit back for addition to the first error signal; and a feed-forward unit that generates an adaptive disturbance signal from the second error signal taken out of the delay unit and feeds the adaptive disturbance signal forward for addition to the first error signal to provide a third error signal.

The repetitive control unit includes a first error signal detector that determines a first error signal on the basis of the target signal and observation signal; an adaptive filter unit that makes the adaptive line spectrum enhancement or adaptive linear prediction of the first error signal detected by the first error signal detector to provide a second error signal; a delay unit that delays the second error signal from the adaptive filter by one period; and a feed-forward unit that generates an adaptive disturbance signal from the second error signal taken out of the delay unit and feeds the adaptive disturbance signal forward for addition to the first error signal to provide a third error signal.

Also, according to another embodiment of the present invention, there is provided servo control method including a first error signal detecting step of determining a first error signal on the basis of a target signal and a signal of observation of a controlled object having a disturbance applied thereto; an adaptive filtering step of making adaptive line spectrum enhancement or adaptive linear prediction of the first error signal detected in the first error detecting step to provide a second error signal; a feed-back step of delaying the second error signal provided in the adaptive filtering step by one period and then feeding back the delayed second error signal for addition to the first error signal; and a feed-forward step of generating an adaptive disturbance signal from the second error signal delayed by the one period and feeding forward the adaptive disturbance signal for addition to the first error signal to output a third error signal, a servo mechanism which is a controlled object being controlled on the basis of the third error signal provided in the feed-forward step.

Therefore, the above servo control method permits to generate, by the adaptive line spectrum enhancement or adaptive linear prediction, the error signal mainly from a rotational sync signal component resulted from reduction of an irrotational sync signal component from a servo error. Also, the repetitive control can be implemented by storing the error signal in a delay unit having a capacity for one period and sequentially updating the error signal in the delay memory.

Also, according to another embodiment of the present invention, there is provided a servo control method including a first error signal detecting step of determining a first error signal on the basis of a target signal and a signal of observation of a controlled object having a disturbance applied thereto; an adaptive filtering step of making adaptive line spectrum enhancement or adaptive linear prediction of the first error signal detected in the first error detecting step to provide a second error signal; and a feed-forward step of delaying the second error signal provided in the adaptive filtering step by one period, generating an adaptive disturbance signal from the second error signal delayed by the one period and feeding forward the adaptive disturbance signal for addition to the first error signal to output a third error signal, a servo mechanism which is a controlled object being controlled on the basis of the third error signal provided in the feed-forward step.

Also, according to another embodiment of the present invention, there is provided an optical disk recording or playback apparatus including a mount on which a removable disk-shaped optical recording medium is mounted; a rotation drive unit that rotates the disk-shaped optical recording medium mounted on the mount at a predetermined velocity; an optical head that records information signal to the information recording surface of the disk-shaped optical recording medium rotated by the rotation drive unit by irradiation of a light beam or reproduces information signal by outputting a signal corresponding to return light from the information recording surface while moving a predetermined lens by a drive mechanism that moves the lens in a focusing and/or tracking direction; and a servo control unit that controls a servo mechanism of the drive mechanism on the basis of an observation signal detected by the optical head, the servo control apparatus including a repetitive control unit that determines a first error signal on the basis of a target signal and a signal of observation of a controlled object having a disturbance applied thereto, makes adaptive line spectrum enhancement or adaptive linear prediction of the first error signal to provide a second error signal, delays the second error signal by one period, generates an adaptive disturbance signal by repetitive control using the delayed second error signal and outputs a third error signal resulted from addition of the disturbance signal thus generated to the first error signal.

The foregoing and other features, aspects and advantages of the present invention will become apparent from the following detailed description of embodiments of the present invention when taken in conjunction with the accompanying drawings.

BEST MODE FOR CARRYING OUT THE INVENTION

The present invention will be described in detail below concerning the embodiments thereof with reference to the accompanying drawings. The first embodiment of the present invention is a servo controller used in an optical disk recorder that records information to a disk-shaped recording medium such as an optical disk, magneto-optical disk, etc. (which will be represented by an optical disk hereunder) and an optical disk player that reproduces information recorded in an optical disk. The servo controller is applied to a focus servo system and tracking servo system in a biaxial actuator of an optical head or to a gap servo system in a biaxial actuator of the optical head used in a near field.

Figure 1:
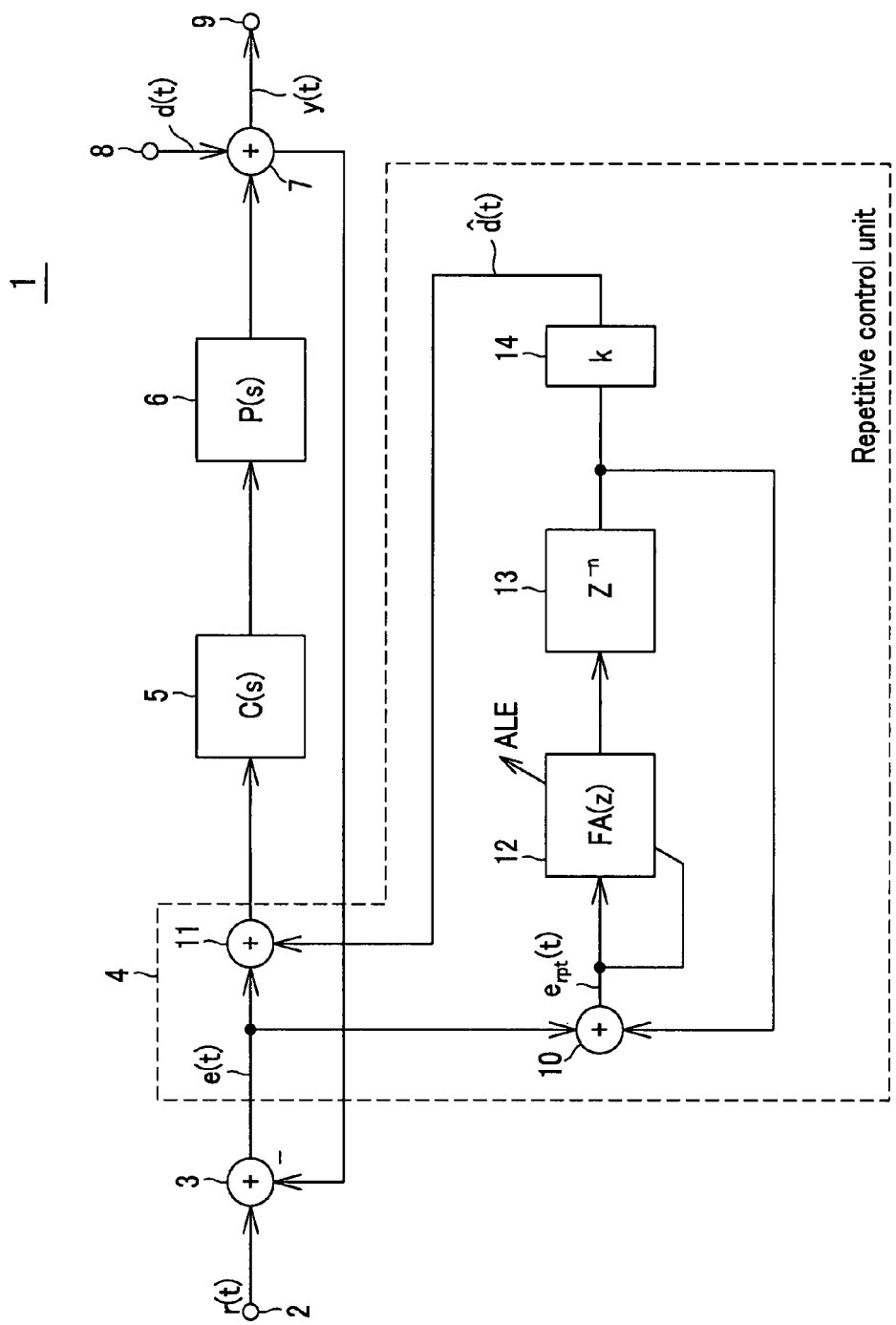
FIG. 1 is a schematic block diagram of a servo controller as an embodiment of the present invention.

Referring now to FIG. 1, there is illustrated in the form of a schematic block diagram a servo controller as the first embodiment of the present invention. The servo controller, generally indicated with a reference numeral 1, is supplied at an input terminal 2 thereof with a target signal r(t), and at an input terminal 8 with a disturbance signal d(t). The servo controller 1 outputs an observation signal y(t) from an output terminal 9 thereof.

The target signal r(t) is constant in value in the optical disk recorder or player, and generally it is zero. The disturbance signal d(t) corresponds to, for example, an axial runout in a focus servo system, and a radial runout in a tracking servo system. The observation signal y(t) corresponds to, for example, a focus error signal or tracking error signal detected by a photodetector in the optical disk recorder.

The target signal r(t) the servo controller 1 receives at the input terminal 2 is supplied to a subtractor 3 which is also supplied with the observation signal y(t) from an adder 7 which will be explained in detail later. The subtractor 3 subtracts the observation signal y(t) from the target signal r(t) to provide a first error signal e(t) (resulted from the subtraction (r(t)−y(t)) which will then be supplied to a recursive control unit 4.

Using an adaptive line spectrum enhancer or adaptive linear prediction unit, the recursive control unit 4 reduces an irrotational sync component the first error signal to provide a second error signal (including mainly a rotational sync signal), and outputs a third error signal obtained by sequentially updating the first error signal while storing the second error signal in a memory (delay unit) having a capacity for one period, to thereby implement the recursive control of a servo error signal (observation signal).

The recursive control unit 4 is supplied at adders 10 and 11 thereof with the first error signal e(t). The adder 10 is also supplied with a fed-back component which will be explained in detail later, and supplies an error signal $e_{rpt}(t)$ as an addition output to an adaptive filter (FA(z)) 12. The adaptive filter (FA(z)) 12 functions as an adaptive line spectrum enhancer (ALE) or adaptive linear prediction unit depending upon a delay m. It is a main part in the servo controller 1 and makes recursive control adaptively. The output (second error signal) from the adaptive filter (FA(z)) 12 is supplied to a delay unit ($Z^{-n}$) 13 in which it will be delayed by one period, and the second error signal thus delayed one period is fed back to the adder 10. The delay output from the delay unit ($Z^{-n}$) 13 is multiplied by a predetermined factor k in a factor multiplier 14 to adaptively produce a disturbance signal $\hat{d}(t)$. The disturbance signal $\hat{d}(t)$ thus produced adaptively is fed forward to the adder 11.

The adder 11 adds together the first error signal e(t) from the subtractor 3 and disturbance signal $\hat{d}(t)$ produced adaptively and supplies the result of addition as a third error signal to a controller (C(s)) 5.

The controller (C(s)) 5 is connected to a controlled object (P(s)) 6 which corresponds to a biaxial actuator in an optical disk recorder/player. The output from the controlled object (P(s)) 6 is supplied to the adder 7 which is also supplied with the disturbance signal d(t). The adder 7 adds together the disturbance signal d(t) and output from the controlled object (P(s)) 6 to output an observation signal y(t) at the output terminal 9 while feeding back the observation signal y(t) to the subtractor 3.

Figure 2:
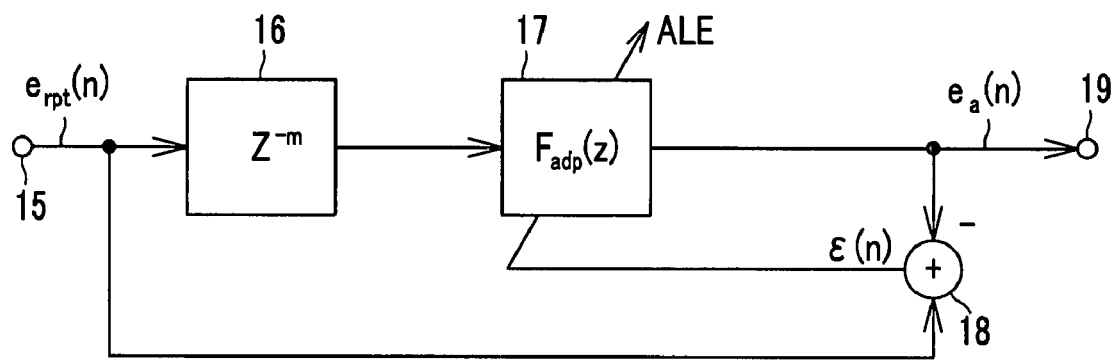
FIG. 2 is also a schematic block diagram of an adaptive filter.

FIG. 2 is a schematic block diagram of the adaptive filter (FA(z)) 12. It should however be noted that of the adaptive filter, a part which converts a continuous signal into a discrete one and a part which converts a discrete signal into a continuous signal, are not shown in this drawing. In the adaptive filter (FA(z)) 12, the first error signal $e_{rpt}(t)$ supplied from the adder 10 shown in FIG. 1 via an input terminal 15 is delayed by a delay unit ($Z^{-m}$) 16 and then filtered by an adaptive filter ($F_{adp}(z)$) 17 to provide a fourth error signal $e_a(n)$. The filtered signal (fourth error signal) is supplied to a subtractor 18. The subtractor 18 subtracts the filtered signal (fourth error signal) from the first error signal $e_{rpt}(t)$ and supplies the result of subtraction $\epsilon(n)$ as a fifth error signal to the adaptive filter ($F_{adp}(z)$) 17. Thus, the subtractor 18 will extract, from the adaptive filter ($F_{adp}(z)$) 17, a parts of a signal (fourth error signal) produced by delaying the first error signal $e_{rpt}(t)$ and filtering the delayed first error signal $e_{rpt}(t)$ by the adaptive filter and a part of the first error signal $e_{rpt}(t)$ neither delayed nor filtered, the parts being correlated to each other, and will output the extracted parts as the result of subtraction $\epsilon(n)$ which is a fifth error signal. The adaptive filter ($F_{adp}(z)$) 17 adaptively filters the delayed error signal $e_{rpt}(t)$ which is the delay output from the delay unit ($Z^{-m}$) 16 to zero the fifth error signal $\epsilon(n)$, and outputs the filter output error signal $e_a(n)$ from the output terminal 19 to the delay unit ($Z^{-n}$) 13 in FIG. 1.

When the delay m is 1 (one), that is, m=1, in the delay unit ($Z^{-m}$) 16 shown in FIG. 2, the adaptive filter ($F_{adp}(z)$) 17 will act as an adaptive linear prediction unit. On the other hand, when the delay m is larger than 1 (one), that is, m>1, the adaptive filter ($F_{adp}(z)$) 17 will act as an adaptive line spectrum enhancing filter.

Figure 3:
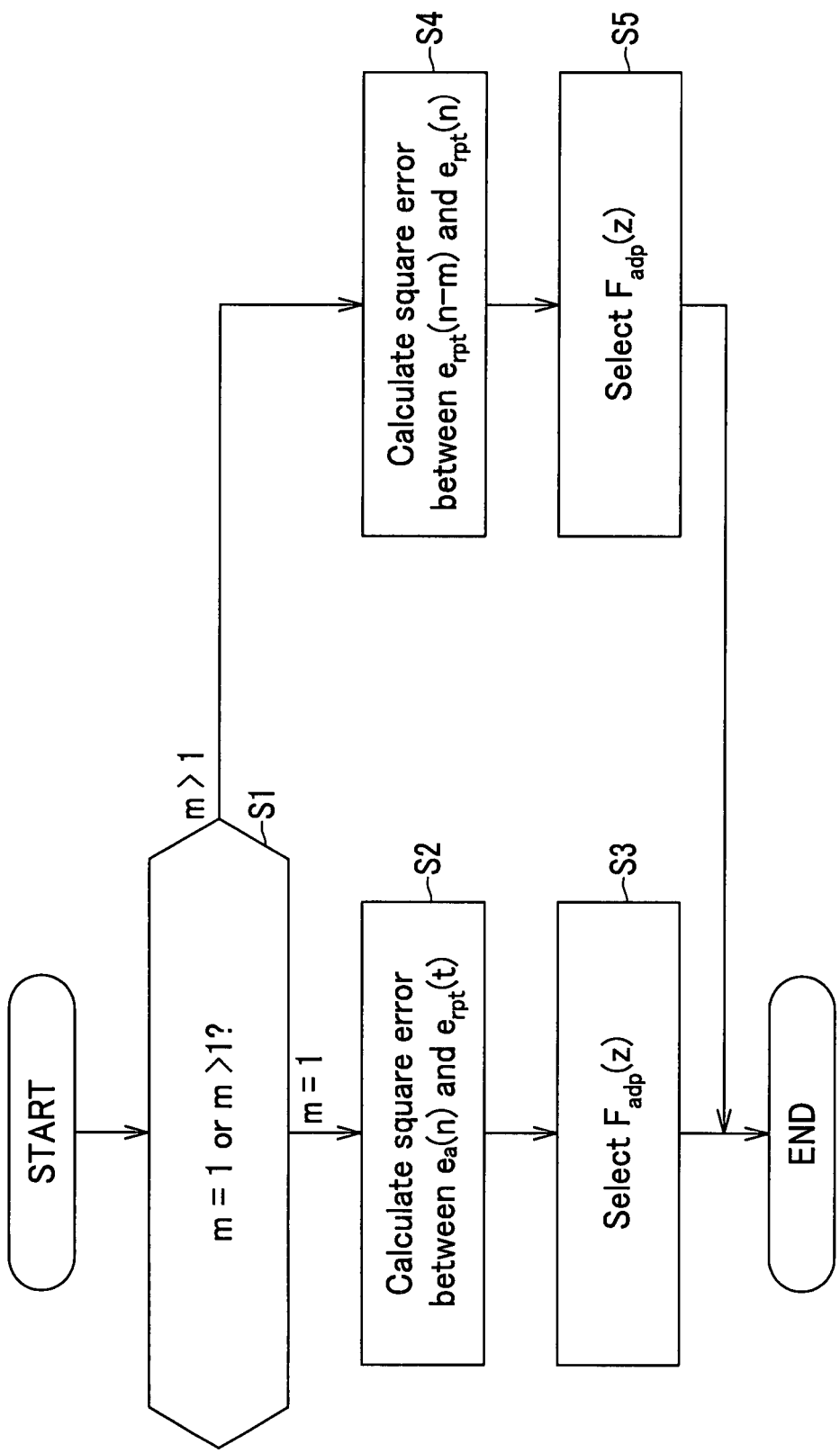
FIG. 3 shows a flow of operations in selecting an adaptive filter.

An adaptive filter ($F_{adp}(z)$) 17 is selected as will be explained below. FIG. 3 shows a flow of operations made in selecting an adaptive filter ($F_{adp}(z)$) 17 on the basis of the delay m. In step S1, the recursive control unit 1 judges whether the delay m is equal to or larger than 1. In case it is determined in step S1 is that the delay m is equal to 1 (m=1), the recursive control unit 4 goes to step S2 where it will calculate a square error of the error signal $\epsilon(n)$ which is a difference between the filter output error signal $e_a(n)$ and error signal $e_{rpt}(t)$. In step S3, the recursive control unit 4 will select an adaptive filter ($F_{adp}(z)$) 17 on the basis of the square error of the error signal $\epsilon(n)$.

If it is determined in step S1 that the delay m is larger than 1 (m>1), the recursive control unit 4 goes to step S4 where it will calculate a square error of the error signal $\epsilon(n)$ which is a difference between the filter output error signal $e_{rpt}(n-m)$ and error signal $e_{rpt}(n)$. Then in step S5, the recursive control unit 4 selects an adaptive filter ($F_{adp}(z)$) 17 on the basis of the square error of the error signal $\epsilon(n)$.

Figure 4:
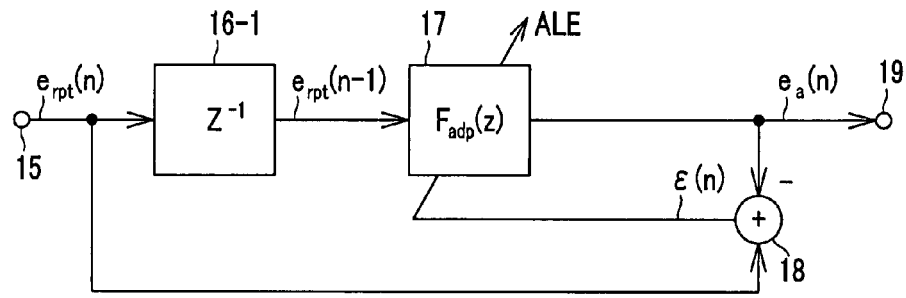
FIG. 4 is a schematic block diagram of an adaptive filter selected when the delay m=1.

FIG. 4 is a schematic block diagram of an adaptive filter ($F_{adp}(z)$) 17 selected when the delay m=1. The error signal $e_{rpt}(n)$ supplied at the input terminal 15 is delayed by the delay unit ($Z^{-1}$) 16-1 to provide a signal $e_{rpt}(n-1)$. This signal $e_{rpt}(n-1)$ is supplied to the adaptive filter ($F_{adp}(z)$ 17. The filtering-result output $e_a(n)$ is subtracted from the error signal $e_{rpt}(n)$ by the subtractor 18 to provide an error signal $\epsilon(n)$ which will be supplied to the adaptive filter ($F_{adp}(z)$) 17. The adaptive filter ($F_{adp}(z)$) 17 selects an adaptive linear prediction unit $F_{adp}(z)$ for the square error of the error signal $\epsilon(n)$ to be 0, and outputs the filtering-result output $e_a(n)$ from the output terminal 19 to the delay unit ($Z^{-n}$) 13 in FIG. 1.

On the assumption that each tap factor of the adaptive filter ($F_{adp}(z)$ 17 selected when the delay m=1 is f(i), the filtering-result output $e_a(n)$ is given by the following expression (1):

$$e_a(n) = \hat{e}_{rpt}(n) = \sum_{i=1}^{M} f(i) e_{rpt}(n-i) \quad (1)$$

Since the expression (1) means that a present signal $\hat{e}_{rpt}(t)$ has been estimated based on a past signal $e_{rpt}(t)$, the adaptive filter ($F_{adp}(z)$) 17 is called "adaptive linear prediction unit". In this system, an adaptive filter ($F_{adp}(z)$) 17 is so selected that the square error of the error signal $\epsilon(n)$, which is a difference between the filter output error signal $e_a(n)$ and error signal $e_{rpt}(t)$, will be smallest.

Since the taps of the adaptive filter ($F_{adp}(z)$) 17 is finite in number, any white noise component (v(n)) in the following expression (2) cannot eventually be predicted, the filter output error signal $e_a(n)$ can be obtained by cutting off the noise component from the original error signal $e_{rpt}(n)$ and thus a desired low-pass filter can be selected.

Figure 5:
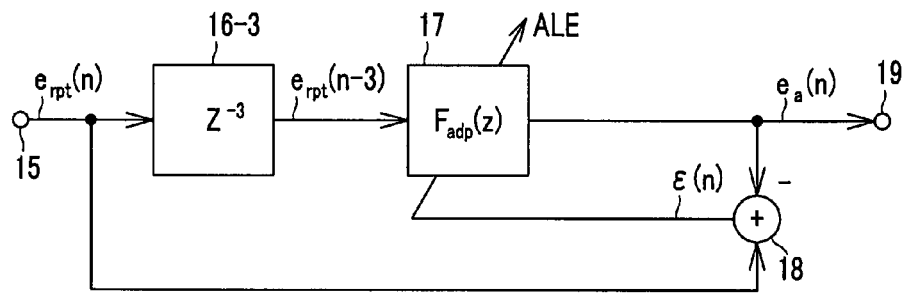
FIG. 5 is also a schematic block diagram of an adaptive filter selected when the delay m=3.

FIG. 5 is a schematic block diagram of an adaptive filter ($F_{adp}(z)$) 17 selected when the delay m=3. The delay m is so selected that the not-delayed signal and delayed signal will not have any correlation between them. The error signal $e_{rpt}(n)$ supplied at the input terminal 15 is delayed by a delay unit ($Z^{-3}$) 16-3 to provide a signal $e_{rpt}(n-3)$. The signal $e_{rpt}(n-3)$ is supplied to the adaptive filter ($F_{adp}(z)$) 17. The filtering-result output $e_a(n-3)$ from the adaptive filter ($F_{adp}(z)$) 17 is subtracted from the error signal $e_{rpt}(n)$ by the subtractor 18 to provide an error signal $\epsilon(n)$ which will be supplied to the adaptive filter ($F_{adp}(z)$ 17.

The error signal $e_{rpt}(n)$ includes a rotational sync signal and rotational async signal and given by the following expression (2):

$$e_{rpt}(n) = \sum_{k=1}^{M} a_k \sin(\omega_k n + \phi_k) + v(n) \quad (2)$$

The adaptive line spectrum enhancer is to reduce or suppress the noise in a sync signal including such a noise (white noise component v(n) in this case) to provide a sync signal component.

As shown in FIG. 5, each tap factor is so selected for the adaptive filter ($F_{adp}(z)$) 17 that the square error of the error signal $\epsilon(n)$, which is a difference between the filter output error signal $e_{rpt}(n-3)$ and error signal $e_{rpt}(n)$, will be smallest. Since there is no correlation between the filter output error signal $e_{rpt}(n-3)$ and error signal $e_{rpt}(n)$, the adaptive filter ($F_{adp}(z)$) 17 will provide a correlated rotational sync signal in the expression (2) and hence the white noise component v(n) will be suppressed. Thus, in case m>1, the adaptive filter ($F_{adp}(z)$) 17 is called "line spectrum enhancer", and also called "adaptive line spectrum enhancer" since it adaptively provides a desired low-pass filter.

Next, the principle on which the servo controller 1 shown in FIG. 1 was worked out will be explained in comparison with some comparative examples.

Figure 6:
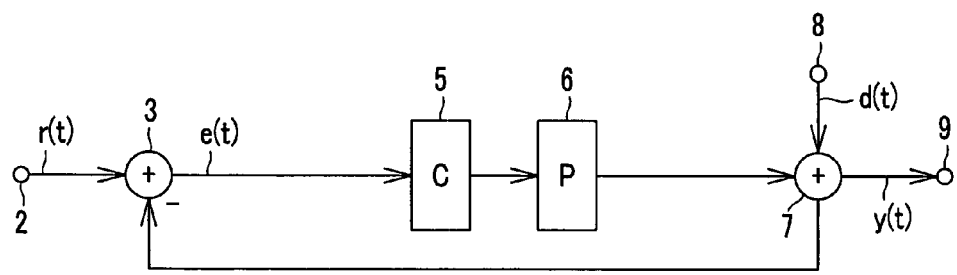
FIG. 6 is a schematic block diagram of a servo controller as a comparative example 1.

FIG. 6 is a schematic block diagram of a servo controller (comparative example 1) 20 such as a general optical disk focus or tracking servo mechanism. The servo controller 20 is a version of the servo controller 1 shown in FIG. 1 and from which the recursive control unit 4 is omitted.

The servo controller 20 is supplied at the input terminal 2 thereof with a target signal r(t). It is also supplied at the input terminal 8 thereof with a disturbance signal d(t). It outputs an observation signal y(t) from the output terminal 9 thereof.

The target signal r(t) supplied at the input terminal 2 is supplied to the subtractor 3 which is also supplied with the observation signal y(t) from the adder 7. Namely, a feedback control loop is formed. Therefore, the subtractor 3 will provide an error signal e(t) resulted from subtraction of the observation signal y(t) from the target signal r(t), which subtraction is given by the following expression (3):

$$e(t) = r(t) - y(t) \quad (3)$$

When the target signal r(t) is 0 in the expression (3), the following expression (4) is derived:

$$e(t) = -y(t) \quad (4)$$

In the feedback control shown in FIG. 6, a controller (C) 5 outputs a controlled variable to a controlled object (P) 6 such as a biaxial actuator so that the error signal e(t) will be zero (0) to put the controlled object P (6) into action for following a disturbance d(t). In other words, by feeding back a signal output from a detector such as a photodetector, servo control is made to suppress the disturbance d(t) in the detection signal for the error signal e(t) to be zero (0). The error signal e(t) corresponds to an operating error. The error signal e(t), when fed back to the subtractor 3, will theoretically be zero (0).

Because of the limitation of the domain of servo control for assuring the safety, however, it is actually difficult to obtain an error signal e(t) of zero in value Namely, there will remain some difference between the target signal r(t) and observation signal y(t). For example, in the focus servo control in an optical disk recorder/player, since reading of the optical disk is not influenced even if the light is not just focused on the optical disk as long as the optical disk stays within the focal depth, an allowable difference is defined as being smaller than the focal depth. For example, the allowable difference is on the order of ±1.9 μm for CD and ±0.9 μm for DVD. In the tracking servo control, the allowable difference (error signal e(t)) depends upon the RF signal processing as well. For example, it is about ±3% to ±4% of the track pitch.

On the other hand, it has been demanded more and more for the optical disk recorder/player that the optical disk should be rotated at a higher velocity for a higher transfer rate. By improving the domain of servo control, the subtraction can be done for the difference (error signal e(t)) to be smaller than the above allowable one as the case may be. However, the domain of servo control cannot be improved because of the limited characteristics (secondary resonance etc.) of the actuator in some cases.

Figure 7:
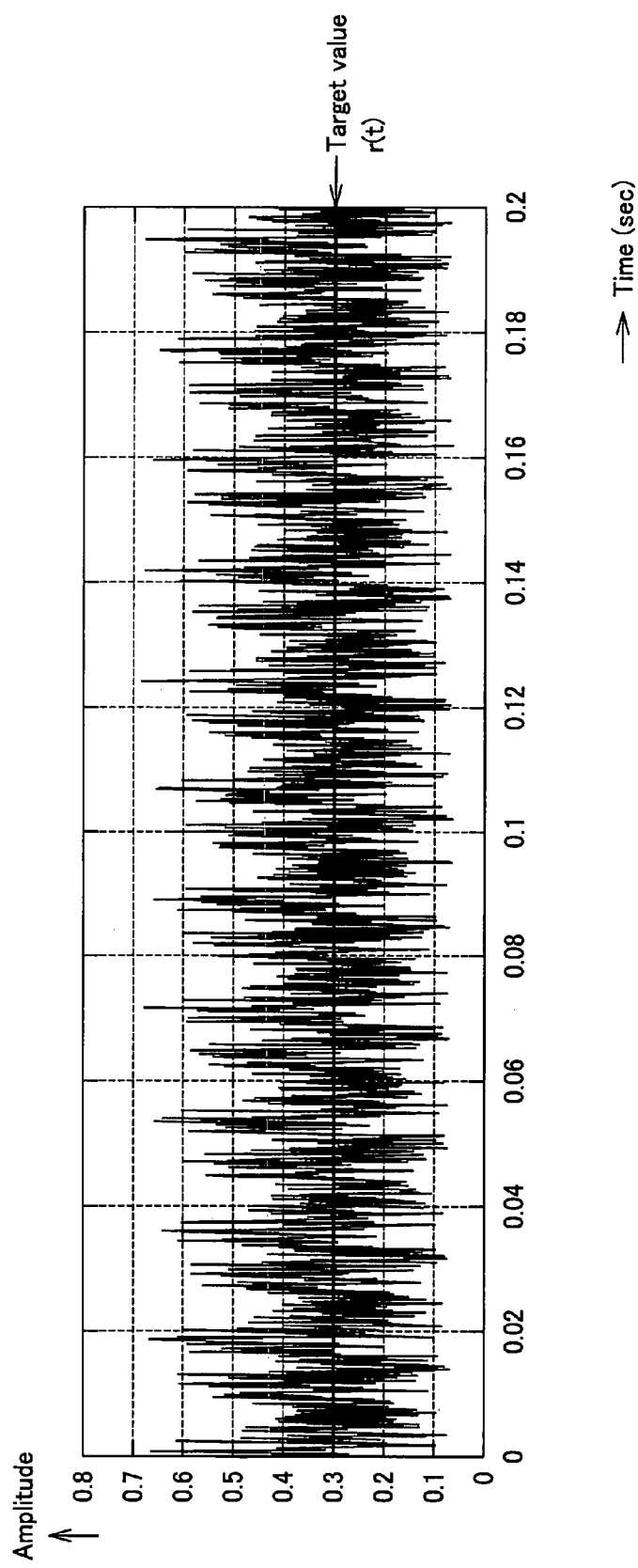
FIG. 7 shows a variation in amplitude level of an error signal e(t) determined as a difference between an observation signal y(t) and a target signal r(t) in relation to a time (sec).

In this case, the difference between the observation signal y(t) and target signal r(t) is larger and hence the error signal e(t) will exceed the allowable focus and tracking errors as shown in FIG. 7, for example. FIG. 7 shows a variation in amplitude level, relative to time (sec), of an error signal e(t) calculated as a difference between an observation signal y(t) and a target signal r(t). As will be seen in FIG. 7, the difference (error signal) between the observation signal y(t) and the target signal r(t) varies largely.

For limiting the variation of the difference in FIG. 7 to approximate the observation signal y(t) to the target value r(t), it will first be conceivable to increase the DC gain. Since the variation of the difference can be limited with a 1/DC gain, increasing the DC gain will permit to limit the difference variation and approximate the observation signal y(t) to the target signal r(t). Since the increase of the DC gain will assure no system stability, however, the approach of increasing the DC gain cannot be adopted.

On this account, it is conceivable to suppress the rotational component on the basis of the observation signal y(t). Since the optical disk is a body of revolution, a difference component (error signal) between the observation signal y(t) and target signal r(t) generally includes a large element is comprised of sum of integral multiples of a period of rotation and is given by the following expression (5):

$$e(t) = \sum_{k=1}^{N} a_k \sin(\omega_k t + \phi_k) + n(t) \quad (5)$$

Figure 8:
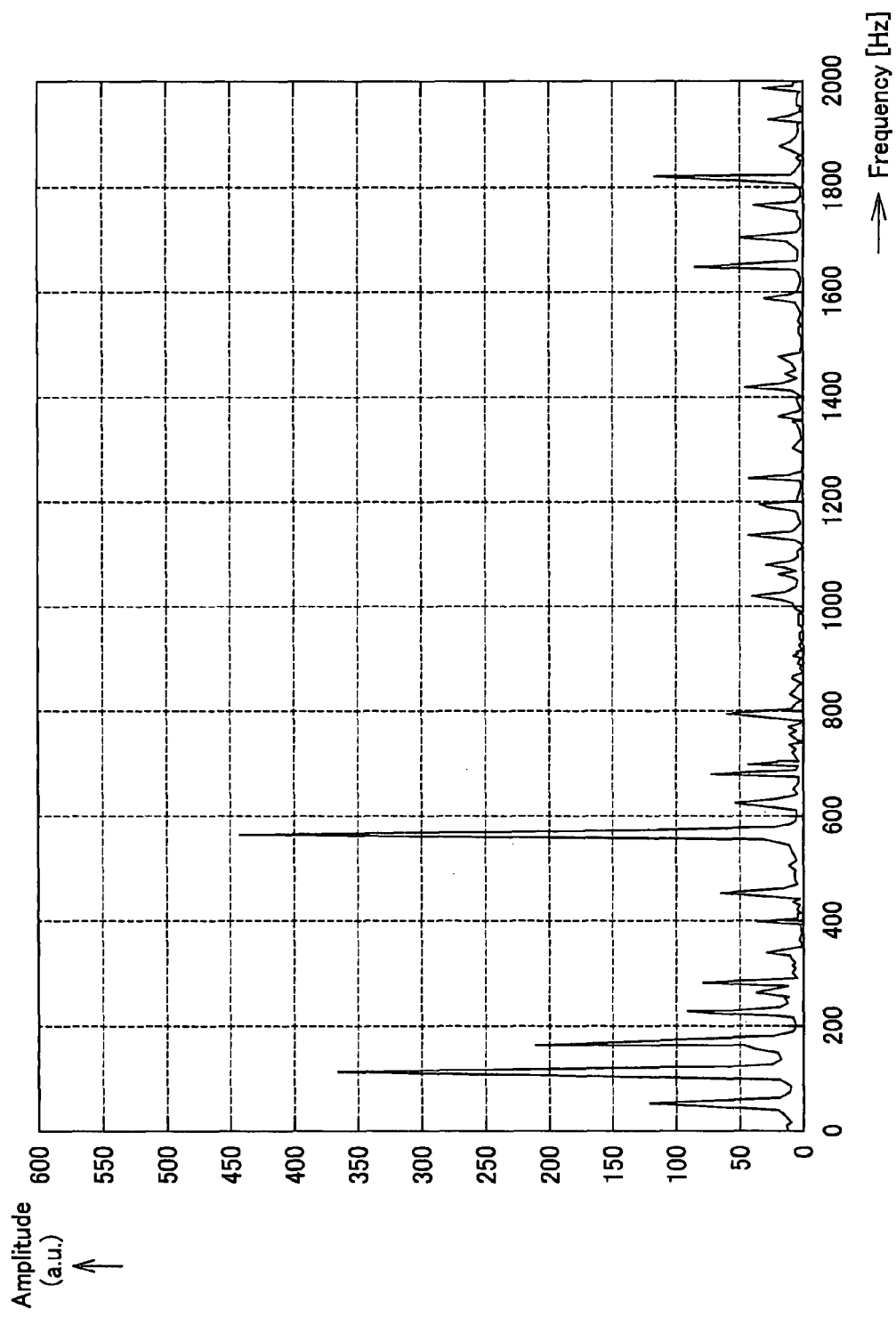
FIG. 8 shows the result of fast Fourier Transform (FFT) analysis of the error signal.

The first term of the expression (5) is a rotational sync component and the second term is an irrotational sync component. The error signal shown in FIG. 7 was subjected to the fast Fourier transform (FFT) analysis and the result of analysis is shown in FIG. 8. In FIG. 8, the horizontal axis indicates a frequency (Hz) and the vertical axis indicates amplitude. The peak amplitude at a frequency of 580 Hz corresponds to N times of the rotational sync component as the first term, and the frequency component of the base portion extending in a high frequency band corresponds to the irrotational sync component as the second term.

Therefore, by providing a disturbance generating model in the controller (C) 5, namely, by providing a mechanism to generate the first term in the servo loop in this comparative example, based on the "internal model principle" well known in the control theory, it is possible to limit the rotational sync component as the first term. As will be seen in FIG. 8, since the first term is dominant, so the above method can be adopted to improve the difference (error signal) between an observation signal and target signal.

Figure 9:
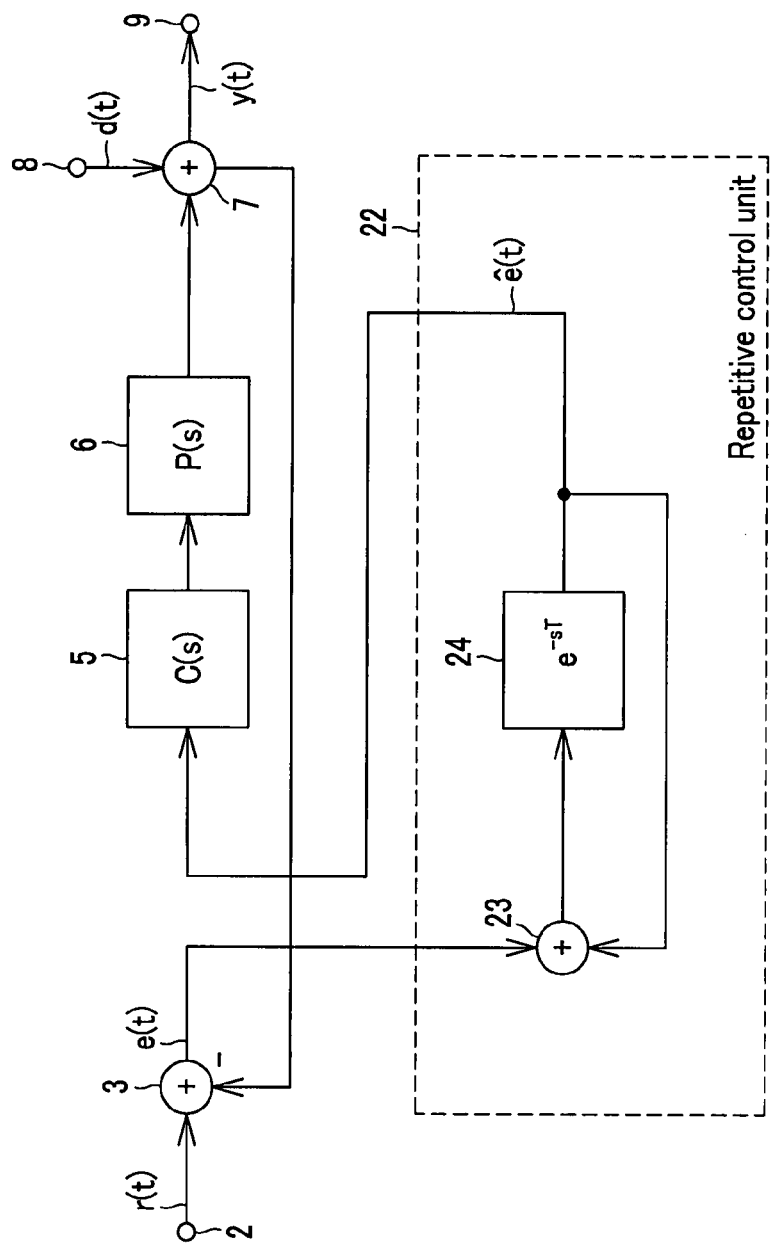
FIG. 9 is a schematic block diagram of the servo controller as a comparative example 2.

A recursive control unit that stores the error signal for one period and makes recursive control is used as the disturbance generating model. A recursive control unit indicated with a reference numeral 22 is connected to the controller (C) 5 in FIG. 6 to build a servo controller 21 (comparative example 2) as shown in FIG. 9. The recursive control unit 22 in the comparative example 2 makes the so-called "recursive control". A memory ($e^{-sT}$) 24 in the recursive control unit 22 stores the error signal for one period. "T" is a time length of the one period, and "s" is a Laplace operator.

As in FIG. 9 showing the construction of the comparative example 2, an error signal e(t) from the subtractor 3 is supplied to the memory ($e^{-sT}$) 24 having a capacity for one period via an adder 23. The memory ($e^{-sT}$) 24 stores the error signal and then supplies it to the adder 23 in the recursive control unit 22. Also, the memory ($e^{-sT}$) 24 feeds forward the error signal e'(t) having been stored for the one period to a controller (C(s)) 5. The controller (Cs)) 5 supplies a controlled variable to the controlled object (P(s)) 6. Therefore, the observation signal y(t) supplied from the adder 7 in the comparative example 2 will be a signal having the rotational sync component thereof limited.

To consider the stability of the recursive control, description will be made hereinbelow with reference to FIG. 9 with attention being paid only to the recursive control of the controller (C(s)=1) 5. In this case, the transfer function $T_{er}(s)$ for the transfer from the target value r(t) to error signal e(t) as in FIG. 9 is given by the following expression (6):

$$T_{er}(s) = \frac{e^{sT}-1}{e^{sT}-1+P(s)} \qquad (6)$$

When it is assumed in the expression (6) that s→∞, P(∞)=0 for the actuator as the controlled variable P(s) 6 is strictly proper (denominator order>numerator order). Reversely, when the denominator order is larger than or equal to the nominator order, a present value will be determined based on a future value, which is impossible in view of the physical law's causality.

Also, when "k" is increased on the assumption that s=j(2kπ)/T, the following expression (7) will be established in these periodic positions of points at infinity on the imaginary axis and the stability of the closed loop system will not be assured:

$$e^{-sT}-1+P(s)=0 \qquad (7)$$

On this account, a correction-type recursive-control unit is conceivable which will be explained below. The correction type recursive control unit is used in place of the recursive control unit 22 in FIG. 9 and connected to the controller (C(s)) 5 to form a servo controller 25 (comparative example 3) as shown in FIG. 10.

Figure 10:
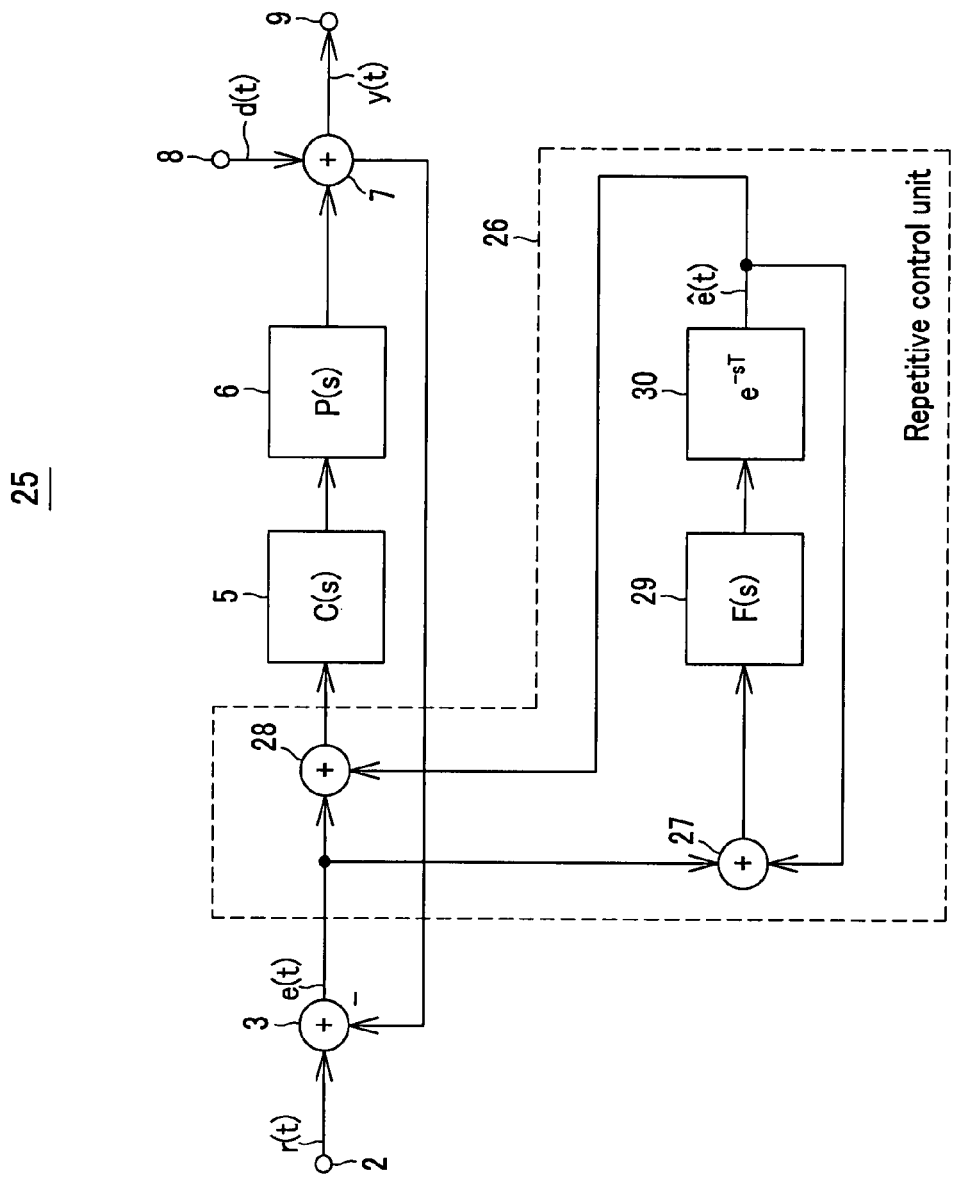
FIG. 10 is a schematic block diagram of the servo controller as a comparative example 3.

As shown in FIG. 10, the error signal e(t) from the subtractor 3 is supplied to adders 27 and 28 in a correction-type recursive control unit 26. The adder 27 supplied with the error signal e(t) will also be supplied with an error signal returned from a memory ($e^{-sT}$) 30 having a capacity for one period. The adder 27 adds the error signal returned from the memory ($e^{-sT}$) 30 to the error signal e(t) and supplies the addition output to a filter 29 (F(s)) 29. The filtering-result output from the filter (F(s)) 29 is held in the memory ($e^{-sT}$) 30 and then returned as an error signal e^(t) to the adder 27 as above while being fed forward to the adder 28 as well. The adder 28 adds together the error signals e(t) and e^(t) and supplies the addition output to the controller (C(s)) 5. The controller (C(s)) 5 supplies a controlled variable to the controlled object (P(s)) 6.

In this case, the transfer function $T_{er}(s)$ for transfer from the target signal r(t) to error signal e(t) is given by the following expression (8):

$$T_{er}(s) = \frac{1}{e^{sT} - \frac{1}{1+C(s)P(s)}F(s)} \times \frac{e^{sT}-F(s)}{1+C(s)P(s)} \qquad (8)$$

On the other hand, it is well known that by selecting a filter (F(s)) 29 to meet conditions A and B represented by the following expressions (9) and (10), respectively, the recursive control unit 26 can be stabilized irrespectively of the period T:

Condition A:

The following should be stable:

$$A\frac{1}{1+C(s)P(s)} \qquad (9)$$

In case the feedback control system with no recursive control unit 26 has a stable closed loop, the above condition A is met. The control system is designed for the closed loop to be stable, the condition A is normally met.

Condition B:

$$\left|\frac{1}{1+C(s)P(s)}F(s)\right| < 1 \text{ where } Re[s] \geq 0 \text{ namely,} \qquad (10)$$

$$|F(s)| < |1+C(s)P(s)|$$

It is essential to design the filter (F(s)) 29 to meet the condition B. When F(s)=1 and the conditions A and B are met, the following expressions (11-1) and (11-2) are given.

$$T_{er}(s) = \frac{1}{1-|\varepsilon|} \times \frac{1-1}{1+C(s)P(s)} = 0 \qquad (11\text{-}2)$$

$$\text{Where } s = j\frac{2\pi k}{T} \qquad (11\text{-}1)$$

Thus, the polarity of the imaginary axis of the target value R(s) is canceled by the zero point of $T_{er}(s)$, so that the error can completely be zeroed.

However, since the controlled object P(s) 6 is strictly proper and P(∞)=0, the condition B cannot be kept met any longer and it is not possible to keep F(s)=1 within the whole frequency bandwidth. On this account, the filter (F(s)) 29 will be set to a low-pass filter which meets the condition B.

Figure 11:
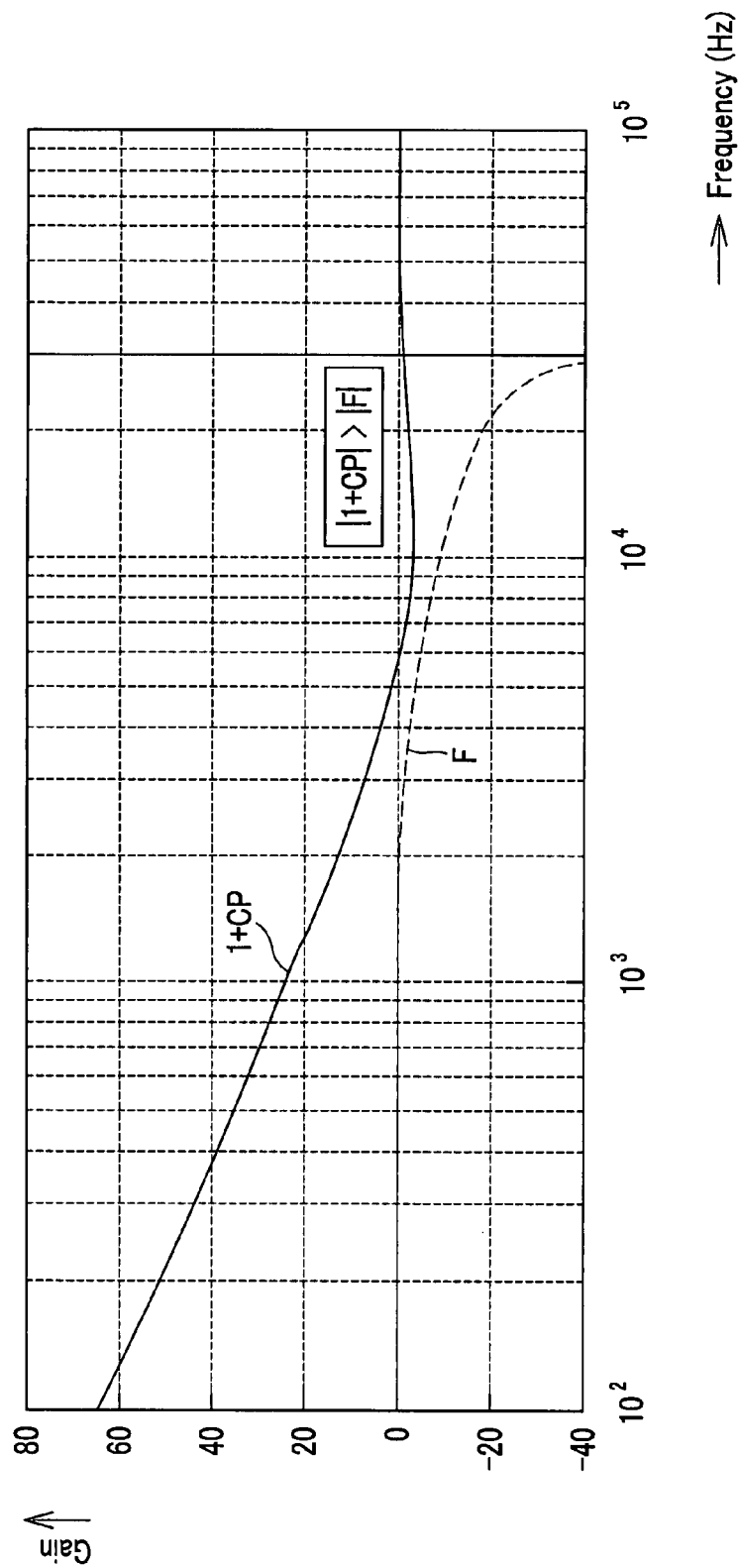
FIG. 11 shows the relation between a typical transfer function 1+CP of a first-order delay low-pass filter and F.

Generally, a first-order delay low-pass filter is used as the filter (F(s)) 29. FIG. 11 shows the relation between a typical transfer function 1+CP of the first-order delay low-pass filter and F. In FIG. 11, the cut-off frequency is 4 kHz. The relation between the transfer function 1+CP and F, shown in FIG. 11, meets the condition B. In case the filter (F(s)) 29 is such a first-order delay low-pass filter, however, when the following expression (12) is given, for example, the transfer function H(s) of the recursive control unit 26 in FIG. 10 is given by the following expression (13):

$$F(s) = \frac{1}{Ts+1} \quad (12)$$

$$H(s) = \frac{1}{1 - \frac{1}{Ts+1}e^{-Ls}} \quad (13)$$

At this time, the transfer function H(s) of the recursive control unit 26 works only as the following expression (14-2) when a periodic disturbance frequency $\omega_k$ is given by the following expression (14-1):

$$H(s) = 1 + \frac{1}{j\omega kT} \quad (14\text{-}2)$$

$$\text{Where } \varpi_k = \frac{2\pi K}{L}(K=0,1,2...) \quad (14\text{-}1)$$

That is, in an ideal case in which F(s)=1, namely, in comparison with T=0, it is ideal that H(s)=∞. However, in case the first-order lag type low-pass filter is used, the gain is limited and no sufficient suppression of disturbance is assured.

Figure 12:
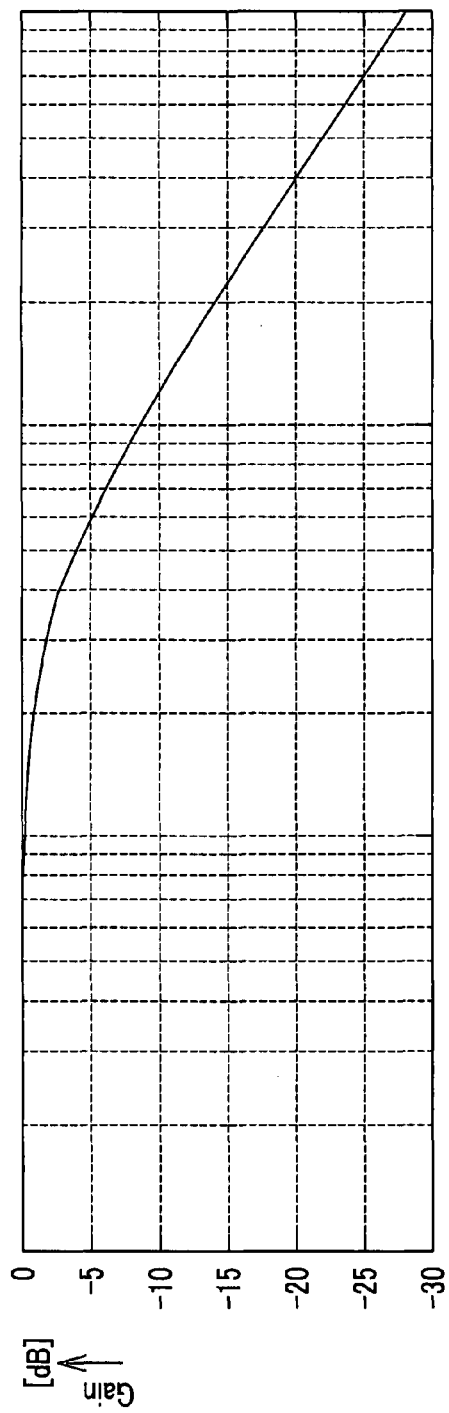
FIG. 12 shows variations in gain and phase, relative to frequency, of the first-order delay low-pass filter.
Figure 12:
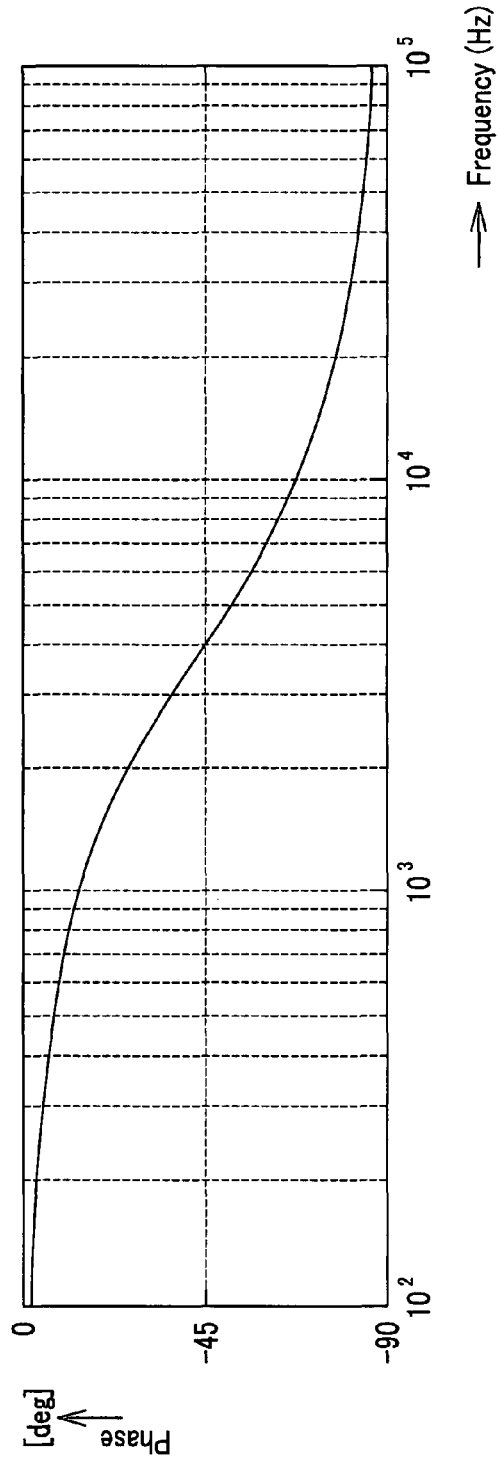

The above problem arises because the first-order delay low-pass filter is such that the gain will not decrease so much (less than 1 kHz, for example) but the phase shifts and the phase shift includes no linear phase characteristic as shown in FIG. 12. If there is included a linear phase characteristic, the frequency will not vary (waveform will not be distorted) only with a time shift of the frequency waveform even if the phase leads. The linear phase characteristic corresponds to a wasted time, for example. On this account, in case a first-order delay low-pass filter is used as the filter (F(s)) 29, the period of repetition is corrected by a delay τ as given by the following expression (15). That is, the recursive control unit is built at a period resulted from the correction, by the delay τ, of the period of repetition:

$$\angle e^{-Ts} \approx \angle F(s)e^{-(T-\tau)s} \quad (15)$$

Figure 13:
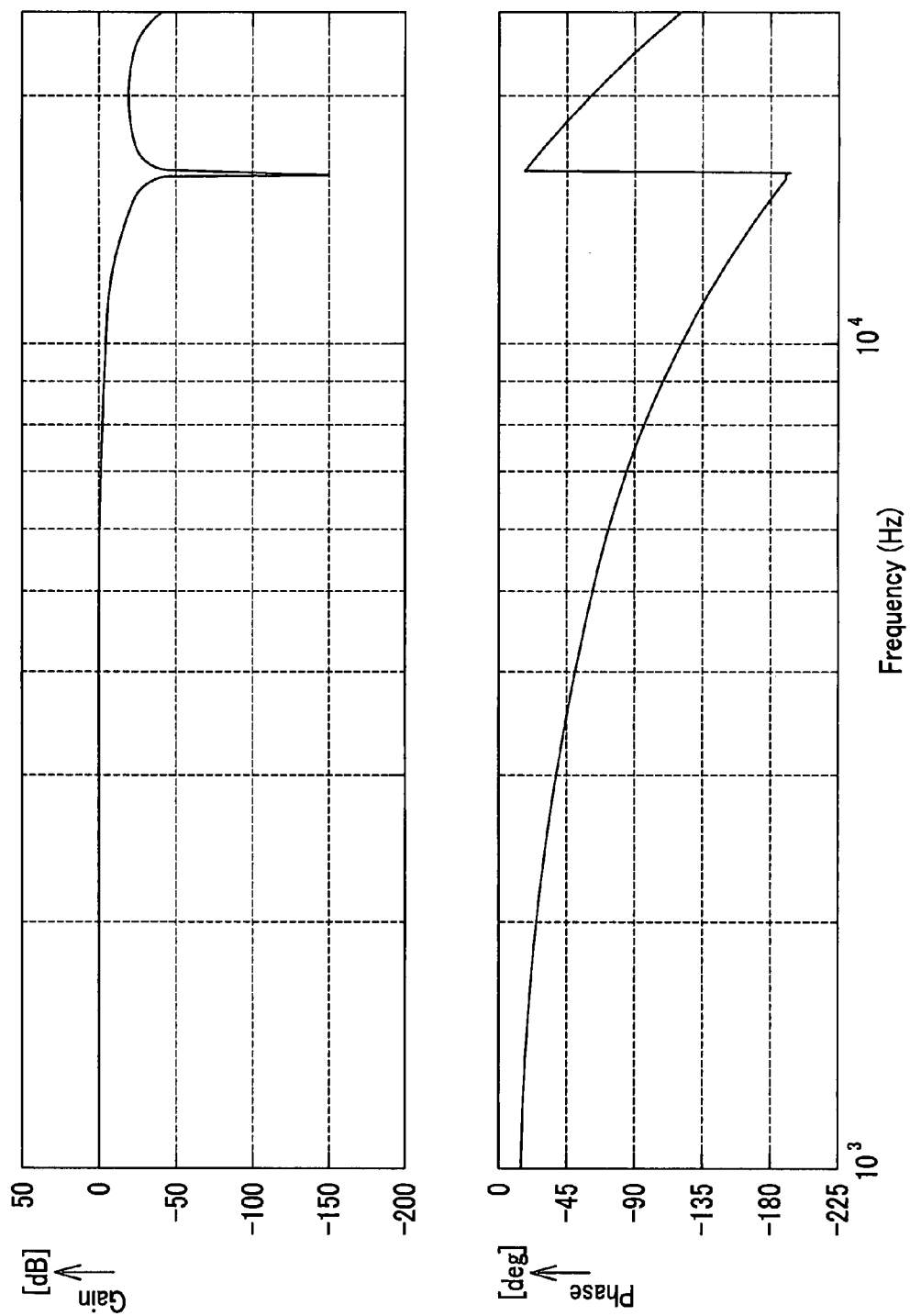
FIG. 13 shows variations in gain and phase, relative to frequency, of the FIR filter.

Otherwise, an FIR filter having a linear phase characteristic may be used as a low-pass filter in order to avoid the above-mentioned problem of the first-order delay low-pass filter. FIG. 13 shows example variations in gain and phase, relative to frequency, of the FIR filter.

As shown in FIG. 13, the FIR filter has a linear phase characteristic and so it does not incur any gain limitation that will arise when the first-order delay low-pass filter is used.

It is well known that in case the FIR low-pass filter is used, a factor is set by providing a desired characteristic in a discrete frequency space and making inverse discrete Fourier transform of the characteristic to determine a time response. However, this technique is more complex than for the first-order delay low-pass filter. Also, the factor cannot be determined without trial and error being made until the specifications are satisfied.

Further, with both the first-order delay low-pass filter and FIR filter, the error due to the rotational sync component can be reduced by increasing the low-pass filter frequency band to the maximum extent possible to meet the condition B. In this case, however, the rotational sync signal as well as rotational async signal will be stored and the rotational async signal component be rather larger than in case no recursive control is used.

That is, the rotational async signal component is given by the following expression (16):

$$s = j\frac{2\pi n + \pi}{T} \quad (16)$$

On the assumption that F(s)=1 within the low-pass filter frequency band, placing the expression (16) into the expression (8) will result in the following expression (17):

$$T_{er}(s) = \frac{2}{2 + C(s)P(s)} \quad (17)$$

Use of no recursive control leads to a case in which F(s)=0. Placing F(s)=0 in the expression (8) will result in the following expression (18):

$$T_{er}(s) = \frac{1}{1 + C(s)P(s)} \quad (18)$$

Comparison between the expressions (17) and (18) will prove that the rotational async signal component is possibly almost two times larger.

At present, to design a low-pass filter F(s) under the present situation, the low-pass filter F(s) is set by changing the cut-off frequency by trial and error so that the error will be smallest.

To design a low-pass filter adaptively to automatically the error signal under the above-mentioned present situation, the Inventors of the present invention have worked out the servo controller 1 shown in FIG. 1 as an embodiment of the present invention.

Next, embodiments of the adaptive filter ($F_{adp}(z)$) 17 in the aforementioned servo controller 1 having previously been explained with reference to FIGS. 1 to 5 will be explained with reference to FIGS. 14 to 22.

Figure 14:
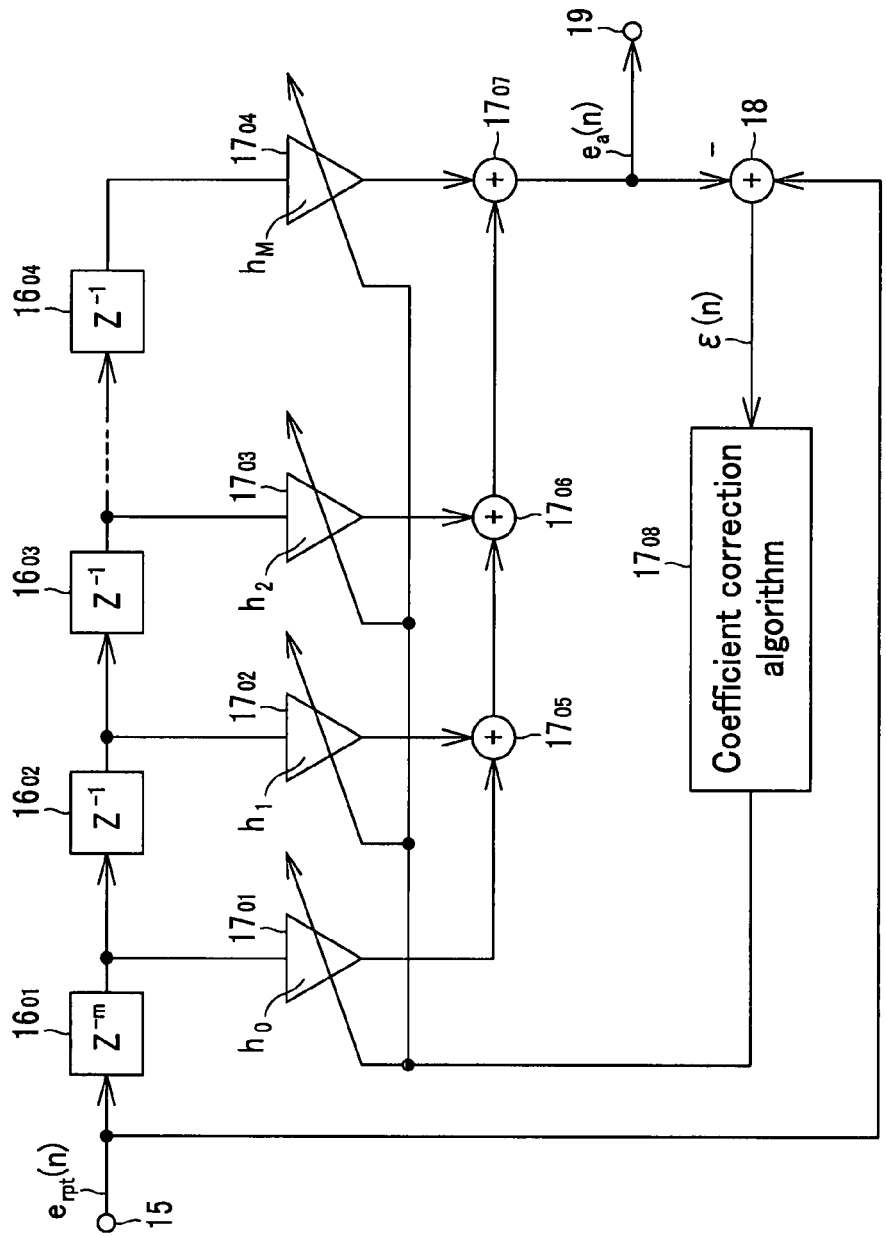
FIG. 14 is a schematic block diagram of the FIR filter usable as an adaptive filter ($F_{adp}(z)$) in case m>1.

FIG. 14 shows an embodiment of the FIR filter usable as an adaptive filter ($F_{adp}(z)$) 17 in case m>1. The FIR filter can have a linear phase characteristic and also a safety assured therefor.

In the FIR filter, the error signal $e_{rpt}(n)$ supplied at the input terminal 15 is delayed by m (>1) by a delay unit ($z^{-m}$) $16_{01}$ and then supplied to a delay unit ($z^{-1}$) $16_{02}$ and multiplier $17_{01}$ for a factor $h_0$. The delay unit ($z^{-1}$) $16_{02}$ further delays (−1) the error signal $e_{rpt}(n)$ having been delayed by m and supplies it to a delay unit ($z^{-1}$) $16_{03}$ and multiplier $17_{02}$ for a factor $h_1$. The delay unit ($z^{-1}$) $16_{03}$ further delays (−1) the delay output from the delay unit ($z^{-1}$) $16_{02}$ and then supplies it to delay units ($z^{-1}$) connected downstream of the delay unit ($z^{-1}$) $16_{03}$ and multiplier $17_{03}$ for a factor $h_2$. Thereafter, the delay output delayed by the delay units ($z^{-1}$) connected downstream of the delay unit ($z^{-1}$) $16_{03}$ and indicated with a dashed line is supplied to a delay unit ($z^{-1}$) $16_{04}$ connected at the last stage and multiplier $17_{04}$ for a factor $h_M$.

The multipliers $17_{01}$, $17_{02}$, $17_{03}$, ..., $17_{04}$ multiply delay outputs from the delay units ($z^{-1}$) $16_{01}$, ($z^{-1}$) $16_{02}$, ($z^{-1}$) $16_{03}$, ..., ($z^{-m}$) $16_{04}$ by the factors $h_0$, $h_1$, $h_2$, ..., $h_M$, respectively, corrected according to a factor correction algorithm that is executed by a factor correction algorithm execution unit $17_{08}$.

The multiplication outputs from the multipliers $17_{01}$, $17_{02}$, $17_{03}$, ..., $17_{04}$ are added together by adders $17_{05}$, $17_{06}$, ..., $17_{07}$ and outputted as an error signal $e_a(n)$ while being supplied to the subtractor 18. The subtractor 18 subtracts the error signal $e_a(n)$ from the error signal $e_{rpt}(n)$ neither delayed nor filtered to products ε(n) and provide it to the factor correction algorithm execution unit $17_{08}$.

The factor correction algorithm execution unit $17_{08}$ corrects the factors $h_0, h_1, h_2, \ldots, h_M$ of the multipliers $17_{01}$, $17_{02}, 17_{03}, \ldots, 17_{04}$ for the square error, for example, of the aforementioned r(n) to be smallest. That is, the adaptive filter $(F_{adp}(z))$ 17 can determine the factors $h_0, h_1, h_2, \ldots, h_M$ of the multipliers $17_{01}, 17_{02}, 17_{03}, \ldots, 17_{04}$ while automatically correcting them. Using the automatically corrected factors $h_0$, $h_1, h_2, \ldots, h_M$, the multipliers $17_{01}, 17_{02}, 17_{03}, \ldots, 17_{04}$ can obtain a signal $e_a(n)$ resulted from cutting of white noise component from the original signal $e_{rpt}(n)$ and output it from the output terminal 19.

Having the linear phase response and also having the safety assured therefor, the FIR filter shown in FIG. 14 can determine the factors $h_0, h_1, h_2, \ldots, h_M$ of the multipliers $17_{01}$, $17_{02}, 17_{03}, \ldots, 17_{04}$ while automatically correcting them, and output the signal $e_a(n)$ from the output terminal 19.

Also, a IIR filter may be used instead of the FIR filter. Different from the FIR filter, the IIR filter have no linear phase response and safety assured therefor. However, it can have a frequency response equivalent to that of the FIR filter at an order lower than that at the FIR filter. Even the IIR filter can be used to build the recursive control unit at a limited order by correcting the delay as in the aforementioned expression (15).

Figure 15:
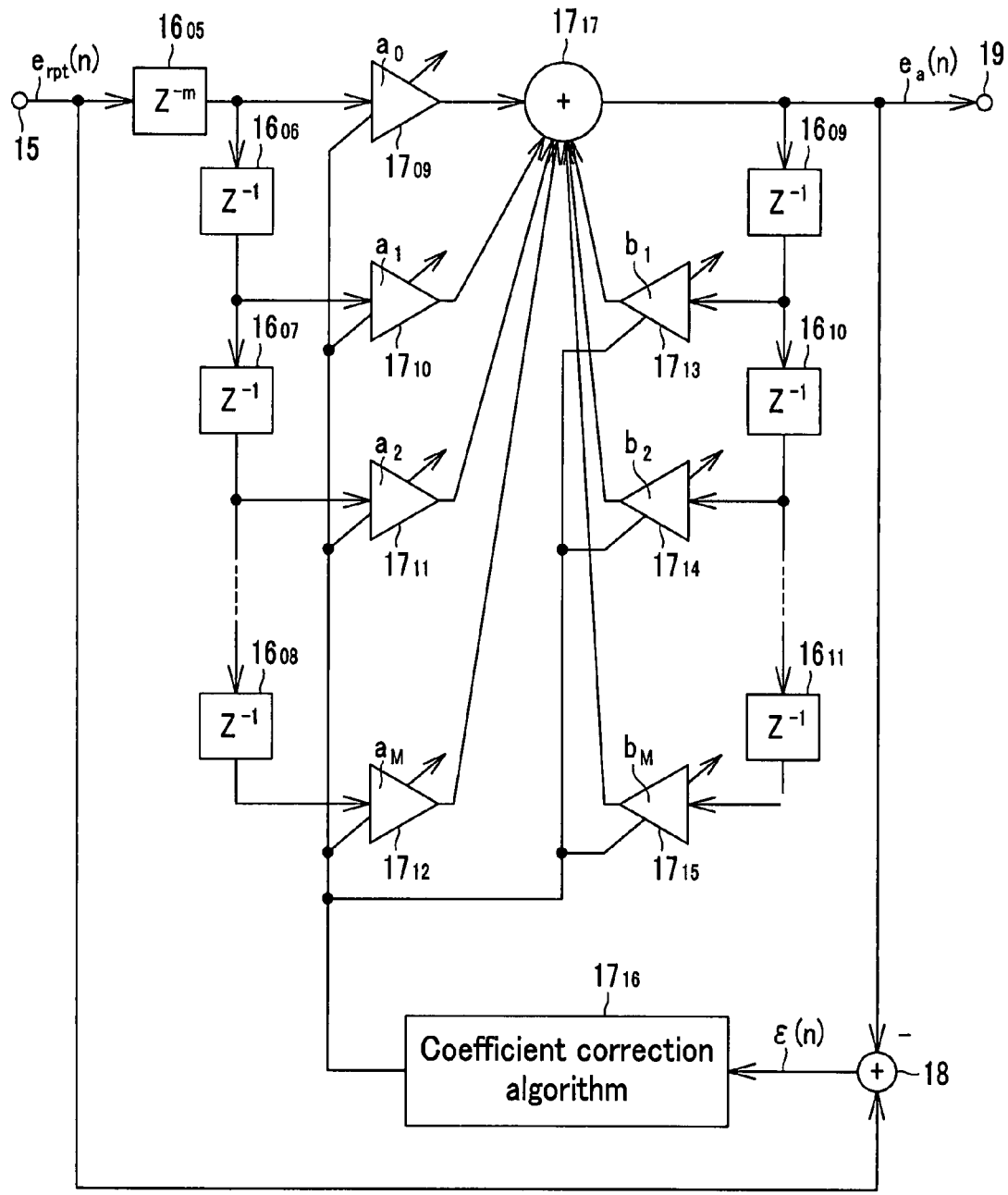
FIG. 15 is a schematic block diagram of a bi-quad direct I type IIR filter usable as an adaptive filter ($F_{adp}(z)$) in case m>1.

FIG. 15 shows a bi-quad direct I type II filter usable as an adaptive filter $(F_{adp}(z))$ 17 in case m>1. The error signal $e_{rpt}(n)$ supplied at the input terminal 15 is delayed by m (>1) by a delay unit $(z^{-m})$ $16_{05}$ and then supplied to a delay unit $(z^{-1})$ $16_{06}$ connected in parallel to the delay unit $(z^{-m})$ $16_{05}$ and multiplier $17_{09}$ for a factor $a_0$. The delay unit $(z^{-1})$ $16_{06}$ further delays (−1) the error signal $e_{rpt}(n)$ having been delayed by m and supplies it to a delay unit $(z^{-1})$ $16_{07}$ and multiplier $17_{10}$ for a factor $a_1$. The delay unit $(z^{-1})$ $16_{07}$ further delays (−1) the delay output from the delay unit $(z^{-1})$ $16_{06}$ and then supplies it to delay units $(z^{-1})$ connected downstream of the delay unit $(z^{-1})$ $16_{07}$ and multiplier $17_{11}$ for a factor $a_2$. Thereafter, the delay output delayed by the delay units $(z^{-1})$ connected downstream of the delay unit $(z^{-1})$ $16_{07}$ and indicated with a dashed line is supplied to a delay unit $(z^{-1})$ $16_{08}$ connected at the last stage and multiplier $17_{12}$ for a factor $a_M$.

The multipliers $17_{09}, 17_{10}, 17_{11}, \ldots, 17_{12}$ multiply the delay outputs from the delay units $(z^{-m})$ $16_{05}, (z^{-1})$ $16_{06}, (z^{-1})$ $16_{07}, \ldots, (z^{-1})$ $16_{08}$ by the factors $a_0, a_1, a_2, \ldots, a_M$, respectively, corrected according to a factor correction algorithm that is executed by a factor correction algorithm execution unit $17_{16}$.

The multiplication outputs from the multipliers $17_{09}, 17_{10}, 17_{11}, \ldots, 17_{12}$ are supplied to an adder $17_{17}$.

The error signal $e_a(n)$, which is the addition output from the adder $17_{17}$, is supplied to a delay unit $(z^{-1})$ $16_{09}$ connected in parallel to the adder $17_{17}$. The delay unit $(z^{-1})$ $16_{09}$ further delays (−1) the delayed error signal $e_a(n)$ and supplies it to a delay unit $(z^{-1})$ $16_{10}$ and multiplier $17_{13}$ for a factor $b_{10}$. The delay unit $(z^{-1})$ $16_{10}$ further delays (−1) the delay output from the delay unit $(z^{-1})$ $16_{09}$ and then supplies it to delay units $(z^{-1})$ connected downstream of the delay unit $(z^{-1})$ $16_{10}$ and multiplier $17_{14}$ for a factor $b_1$. Thereafter, the delay output delayed by the delay units $(z^{-1})$ connected downstream of the delay unit $(z^{-1})$ $16_{10}$ and indicated with a dashed line is supplied to a delay unit $(z^{-1})$ $16_{11}$ and multiplier $17_{15}$ for a factor $b_M$.

The multipliers $17_{13}, 17_{14}, \ldots, 17_{15}$ multiply the delay outputs from the delay units $(z^{-m})$ $16_{09}, (z^{-1})$ $16_{10}, \ldots, (z^{-1})$ $16_{11}$ by the factors $b_0, b_1, \ldots, b_M$, respectively, corrected according to a factor correction algorithm that is executed by the factor correction algorithm execution unit $17_{16}$. The multiplication outputs from the multipliers $17_{13}, 17_{14}, \ldots, 17_{15}$ are returned to an adder $17_{17}$.

The adder $17_{17}$ supplies the addition output to the subtractor 18 while outputting it as the error signal $e_a(n)$. The subtractor 18 subtracts the error signal $e_a(n)$ from the error signal $e_{rpt}(n)$ neither delayed nor filtered to provide ε(n) and supplies it to the factor correction algorithm execution unit $17_{16}$.

The factor correction algorithm execution unit $17_{16}$ corrects the factors $a_0, a_1, a_2, \ldots, a_M$ of the multipliers $17_{09}, 17_{10}, 17_{11}, \ldots, 17_{12}$ for the square error, for example, of the aforementioned ε(n) to be smallest. It also corrects the factors $b_0, b_1, \ldots, b_M$ of the multipliers $17_{13}, 17_{14}, \ldots, 17_{15}$. That is, the adaptive filter $(F_{adp}(z))$ 17 can determine the factors $a_0, a_1$, $a_2, \ldots, a_M$ of the multipliers $17_{09}, 17_{10}, 17_{11}, \ldots, 17_{12}$ and factors $b_0, b_1, \ldots, b_M$ of the multipliers $17_{13}, 17_{14}, \ldots, 17_{15}$ while automatically correcting them. Using the automatically corrected factors $a_0, a_1, a_2, \ldots, a_M$ and factors $b_0, b_1, \ldots, b_M$, the multipliers $17_{09}, 17_{10}, 17_{11}, \ldots, 17_{12}$ and multipliers $17_{13}$, $17_{14}, \ldots, 17_{15}$ can obtain a signal $e_a(n)$ resulted from cutting of white noise component from the original signal $e_{rpt}(n)$ and output it from the output terminal 19.

Different from the FIR filter, the IIR filter shown in FIG. 15 has no linear phase response and safety assured therefor. However, it can have a frequency gain response equivalent to that of the FIR filter at an order lower than that at the FIR filter unless there exists any phase delay.

Figure 16:
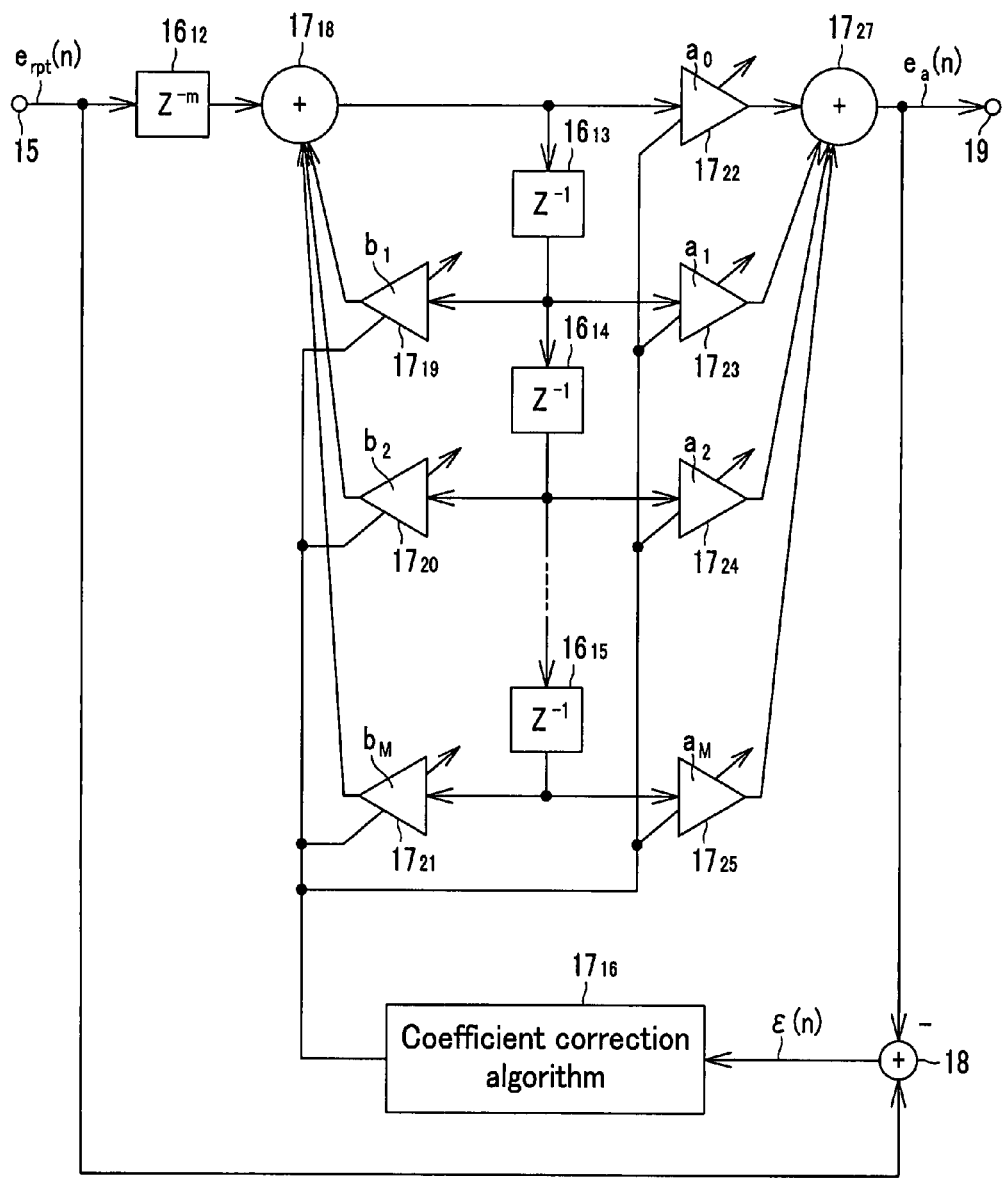
FIG. 16 is a schematic block diagram of a IIR filter of a bi-quad direct II type usable as an adaptive filter ($F_{adp}(z)$) in case m>1.

FIG. 16 is a schematic block diagram of a IIR filter of a bi-quad direct II type usable as an adaptive filter $(F_{adp}(z))$ 17 in case m>1. The error signal $e_{rpt}(n)$ supplied at the input terminal 15 is delayed by m (>1) by a delay unit $(z^{-m})$ $16_{12}$ and then supplied to an adder $17_{18}$. The addition output from the adder $17_{18}$ is supplied to a delay unit $(z^{-1})$ $16_{13}$ connected in parallel to the adder $17_{18}$ and multiplier $17_{22}$ for the factor $a_0$. The delay unit $(z^{-1})$ $16_{13}$ further delays (−1) the error signal $e_{rpt}(n)$ having been delayed by m and supplies it to a delay unit $(z^{-1})$ $16_{14}$, multiplier $17_{19}$ for the factor $b_1$ and multiplier $17_{23}$ for the factor $a_1$. The delay unit $(z^{-1})$ $16_{14}$ further delays (−1) the delay output from the delay unit $(z^{-1})$ $16_{13}$ and then supplies it to delay units $(z^{-1})$ connected downstream of the delay unit $(z^{-1})$ $16_{14}$, multiplier $17_{20}$ for the factor $b_2$ and multiplier $17_{24}$ for the factor $a_2$. Thereafter, the delay output delayed by the delay units $(z^{-1})$ connected downstream of the delay unit $(z^{-1})$ $16_{14}$ and indicated with a dashed line is supplied to a delay unit $(z^{-1})$ $16_{15}$, multiplier $17_{21}$ for the factor $b_M$ and multiplier $17_{25}$ for the factor $a_M$.

The multipliers $17_{19}, 17_{20}, \ldots, 17_{21}$ multiply the delay outputs from the delay units $(z^{-1})$ $16_{15}, (z^{-1})$ $16_{14}, \ldots, (z^{-1})$ $16_{15}$ by the factors $b_1, b_2, \ldots, b_M$, respectively, corrected according to a factor correction algorithm that is executed by a factor correction algorithm execution unit $17_{26}$. Also, the multipliers $17_{22}, 17_{23}, 17_{24}, \ldots, 17_{25}$ multiply the delay outputs supplied from the delay units $(z^{-m})$ $16_{12}, (z^{-1})$ $16_{13}$, $(z^{-1})$ $16_{14}, \ldots, (z^{-1})$ $16_{15}$ via the adder $17_{18}$ by the factors $a_0$, $a_1, a_2, \ldots, a_M$, respectively, corrected according to the factor correction algorithm that is executed by the factor correction algorithm execution unit $17_{26}$.

The multiplication outputs from the multipliers $17_{19}$, $17_{20}, \ldots, 17_{21}$ are supplied to the adder $17_{18}$. Also, the multiplication outputs from the multipliers $17_{22}, 17_{23}$, $17_{24}, \ldots, 17_{25}$ are supplied to an adder $17_{27}$.

The error signal $e_a(n)$, which is the addition output from the adder $17_{27}$, is supplied to the output terminal 19 and also to the subtractor 18. The subtractor 18 subtracts the error signal $e_a(n)$ from the error signal $e_{rpt}(n)$ neither delayed nor filtered to provide ε(n) and supplies it to the factor correction algorithm execution unit $17_{26}$.

The factor correction algorithm execution unit $17_{26}$ corrects the factors $b_1, b_2, \ldots, b_M$ of the multipliers $17_{19}, 17_{20}, \ldots, 17_{21}$ for the square error, for example, of the aforementioned $\epsilon(n)$ to be smallest. It also corrects the factors $a_0, a_1, a_2, \ldots, a_M$ of the multipliers $17_{22}, 17_{23}, 17_{24}, \ldots, 17_{25}$. That is, the adaptive filter ($F_{adp}(z)$) 17 can determine the factors $b_1, b_2, \ldots, b_M$ of the multipliers $17_{19}, 17_{20}, \ldots, 17_{21}$ and factors $a_0, a_1, a_2, \ldots, a_M$ of the multipliers $17_{22}, 17_{23}, 17_{24}, \ldots, 17_{25}$ while automatically correcting them. Using the automatically corrected factors $b_1, b_2, \ldots, b_M$ and $a_0, a_1, a_2, \ldots, a_M$, the multipliers $17_{19}, 17_{20}, \ldots, 17_{21}$ and multipliers $17_{22}, 17_{23}, 17_{24}, \ldots, 17_{25}$ can obtain a signal $e_a(n)$ resulted from cutting white noise component from the original signal $e_{rpt}(n)$ and output it from the output terminal 19.

Different from the FIR filter, the IIR filter of the bi-quad direct II type shown in FIG. 16 has no linear phase response and safety assured therefore. However, it can have a frequency gain response equivalent to that of the FIR filter at an order lower than that at the FIR filter unless there exists any phase delay. Also, the IIR filter of the bi-quad direct II type can sufficiently function with a half of the number of delay units in the IIR filter of the bi-quad direct I type shown in FIG. 15.

Each of the factors of the filters of which the construction is shown in FIGS. 14, 15 and 16 is determined based on the factor correction algorithm executed by the factor correction algorithm execution units $17_{08}, 17_{16}$ and $17_{26}$ so that the square mean error between the actual error signal $e_{rpt}(n)$ and filter output $e_a(n)$ will be smallest. As an adaptive algorithm to minimize the square mean error of the error $\epsilon(n)$, there is used the RLS (Recursive Least Square) algorithm based on the well-known least square algorithm or LMS algorithm based on the sequential correction algorithm.

For example, the LMS algorithm is used to determine factors for the filters shown in FIGS. 14, 15 and 16 as given by the following expressions (19), (20) and (21), respectively.

A factor is determined for the FIR filter shown in FIG. 14 as given by the expression (19):

$$h_k(n+1)=h[n]+\mu \cdot \epsilon[n] \cdot x[n-k] \ (k=0,1 \ldots M) \quad (19)$$

Factors $a_k$ and $b_k$ for the IIR filters shown in FIGS. 15 and 16 are determined as given by the following expressions (20) and (21), respectively:

$$a_k(n+1)=a[n]+\mu \cdot \epsilon[n] \cdot x[n-k] \ (k=0,1 \ldots M) \quad (20)$$

$$b_k(n+1)=b[n]+\mu \cdot \epsilon[n] \cdot x[n-k] \ (k=0,1 \ldots M) \quad (21)$$

It should be noted that "$\mu$" in the expressions (19), (20) and (21) is a parameter that determines the speed of factor convergence.

Figure 17:
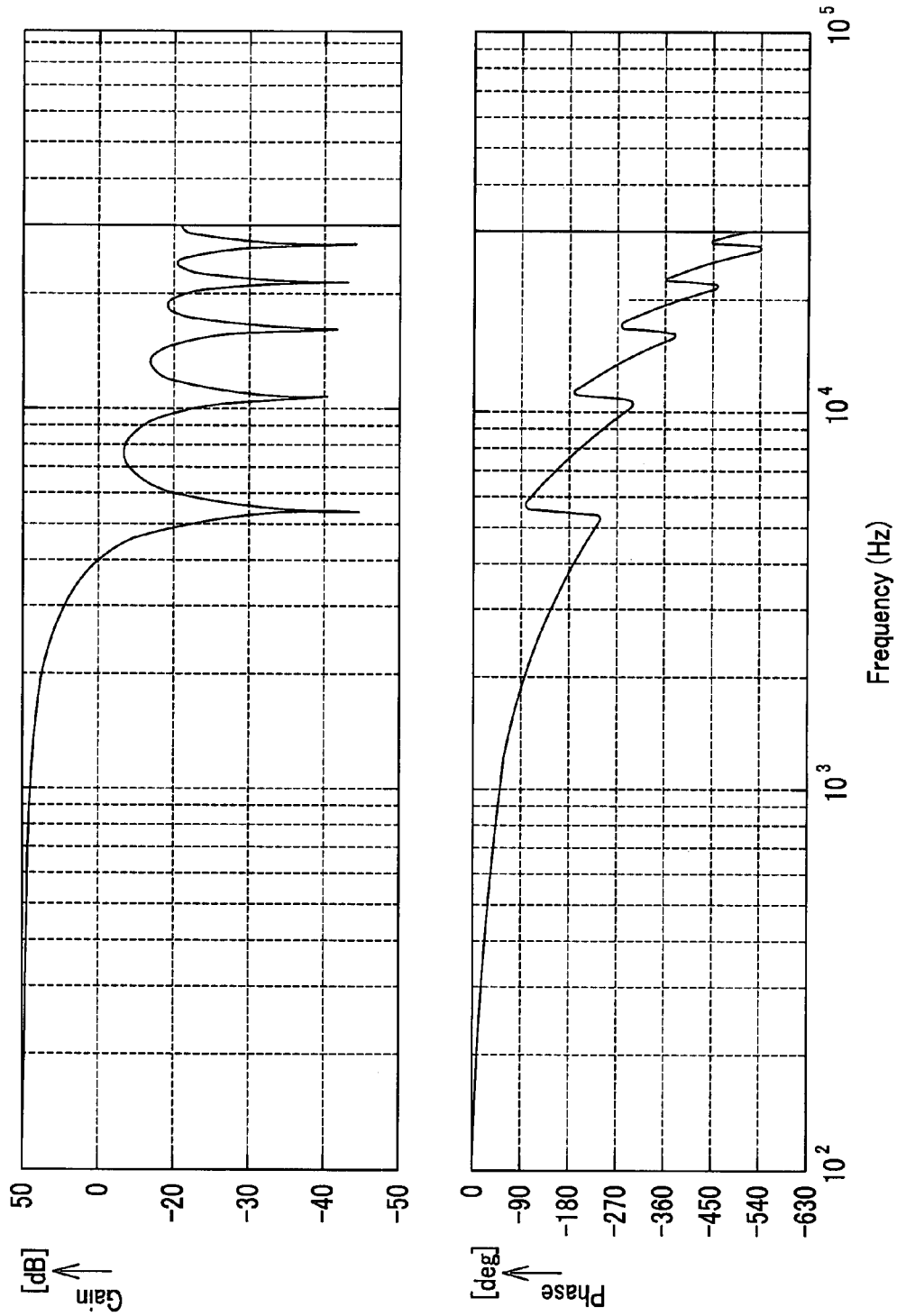
FIG. 17 shows variations in gain and phase, relative to frequency, of the filter ($F_{adp}(s)$) adapted using an adaptive line spectrum enhancer (ALE) based on the FIR filter shown in FIG. 14.

FIG. 17 shows changes in gain and phase, relative to frequency, of the filter ($F_{adp}(s)$) 17 adapted using the adaptive line spectrum enhancer based on the FIR filter shown in FIG. 14. As will be seen in FIG. 17, the frequency response of the filter thus determined corresponds to that of a low-pass filter of which the cut-off frequency is around $10^3$ Hz. Also, it will be seen that the filter has the linear phase characteristic because the filter is of the FIR filter.

Figure 18:
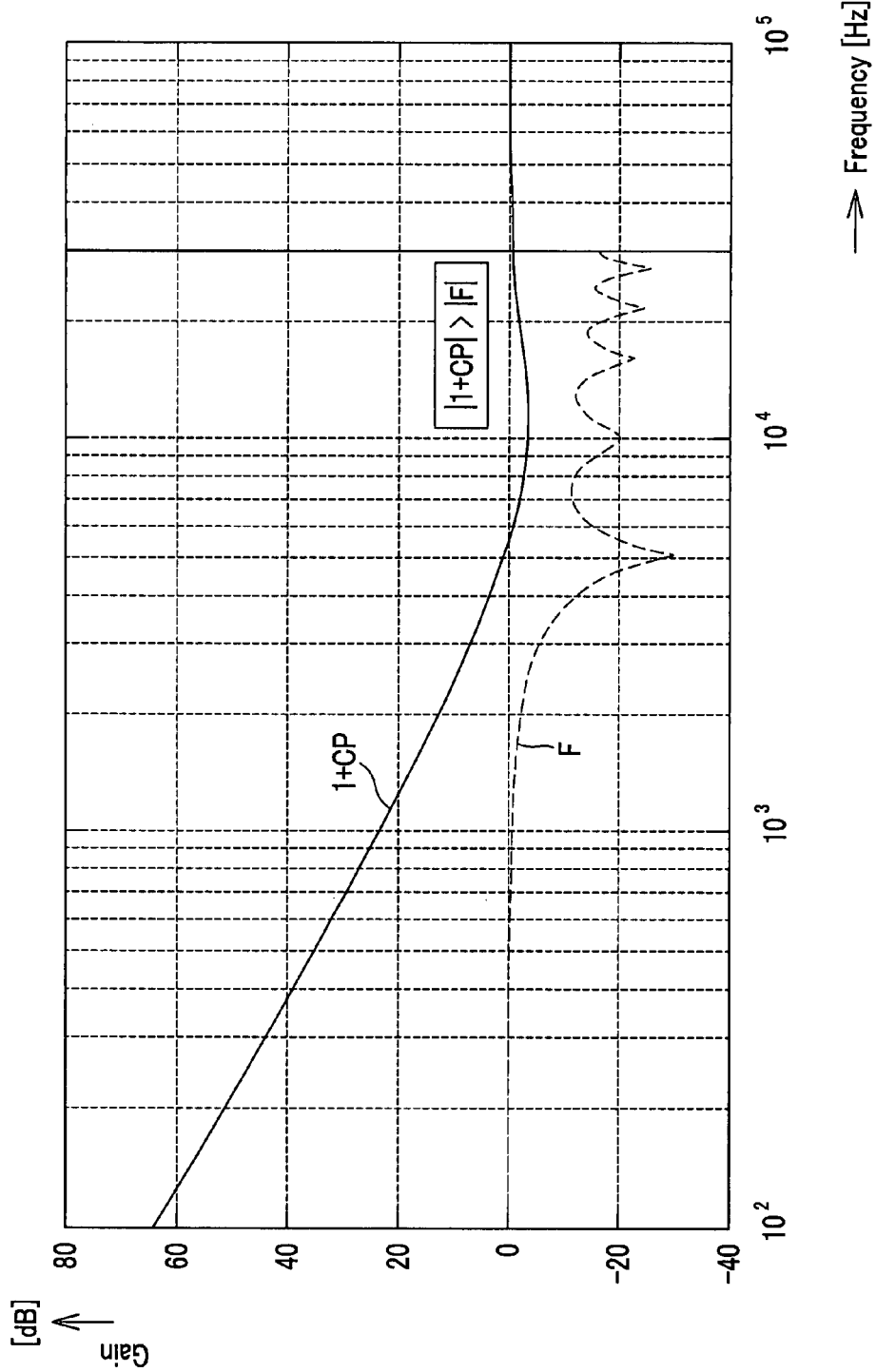
FIG. 18 shows the relation between $F_{adp}(s)$ and transfer function 1+CP.

Also, FIG. 18 shows the relation between $F_{adp}(s)$ and transfer function 1+CP. As will be seen in FIG. 18, the relation meets the condition B given by the expression (10).

Figure 19A:
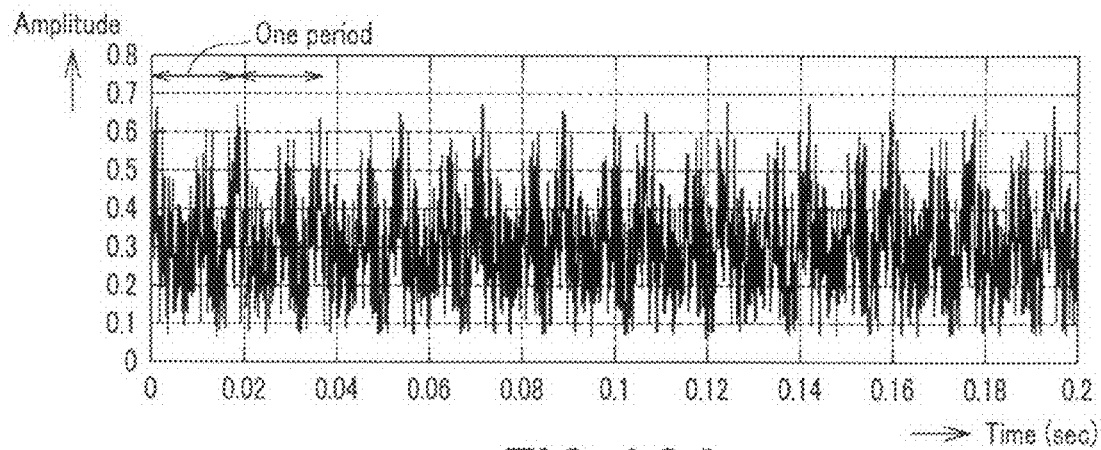
FIG. 19A shows the amplitude characteristic of an original focus error signal in the servo controller as the first embodiment.
Figure 19B:
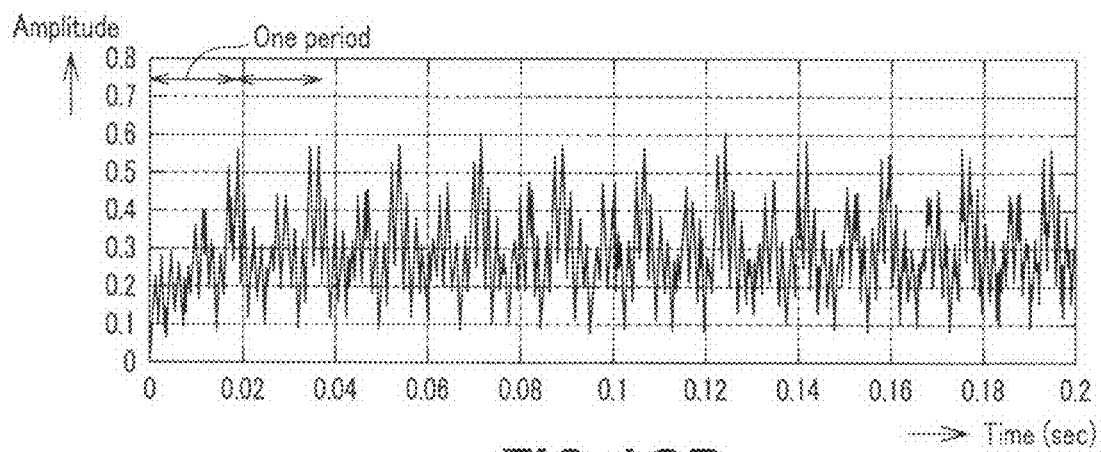
FIG. 19B shows the amplitude characteristic of a focus error signal having been filtered by a filter adapted by ALE in the servo controller as the first embodiment.
Figure 19C:
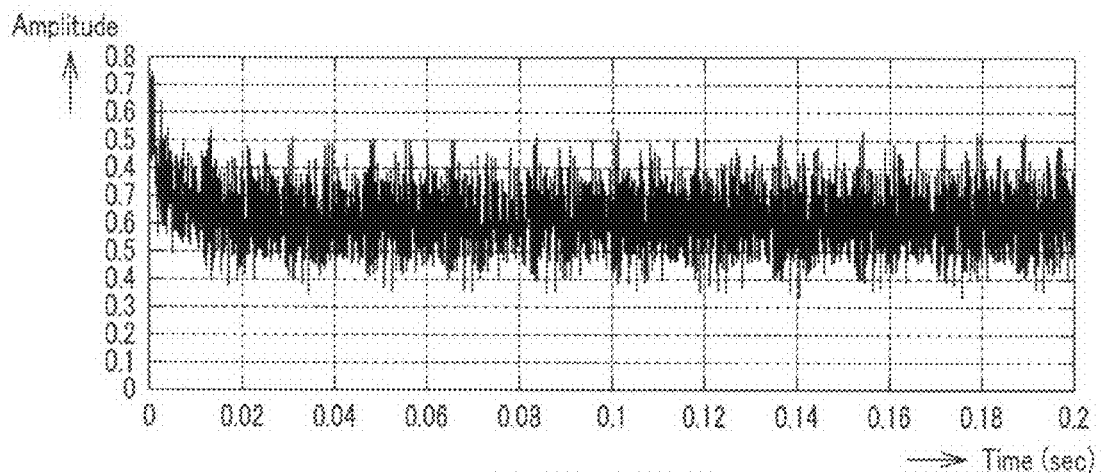
FIG. 19C shows the amplitude characteristic of a signal of a difference between the original focus error signal and the focus error signal downstream of the filter adapted by ALE.

Further, FIG. 19 shows examples of the effect of this first embodiment. FIG. 19A shows an original focus error signal including a rotational async signal, FIG. 19B shows an focus error signal at a position being downstream of the filter adapted by ALE in the servo controller as the first embodiment. FIG. 19C shows the amplitude characteristic of a signal of a difference between the original focus error signal in FIG. 19A and focus error signal in FIG. 19B. The difference signal is a rotational async component.

Based on the adaptive filter using the adaptive line spectrum enhancer (ALE) according to the present invention, a digital filter is adaptively designed to automatically provide a low-pass filter having the characteristic shown in FIG. 17, resulting in a signal of which the rotational async component has been reduced as shown in FIG. 19C. It should be noted that in FIG. 19, the period from 0 to 0.02 sec indicates a transient phenomenon until the adaptive filter can provide a steady output. The length of the transient phenomenon depends upon the parameter $\mu$ that determines the speed of factor convergence shown in the expressions (19) to (21). In the example shown in FIG. 19, the transient phenomenon lasts for one period.

Figure 20A:
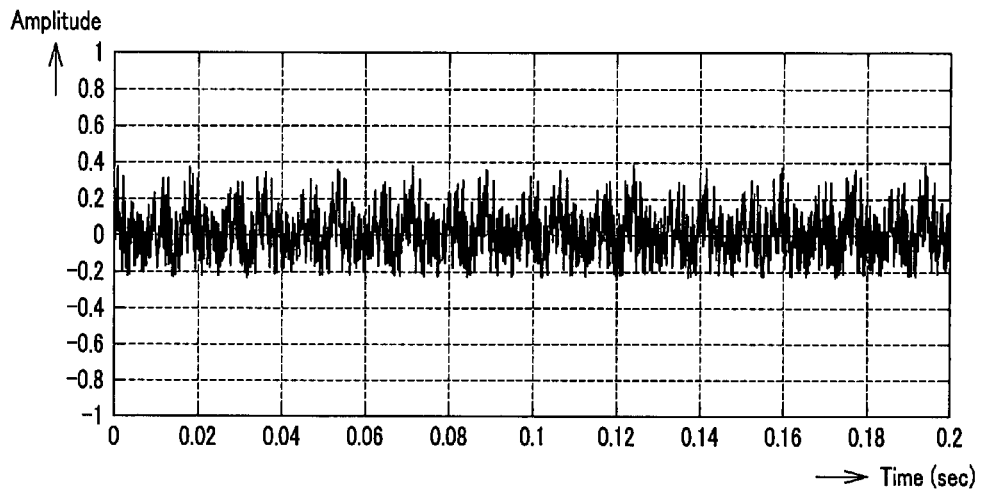
FIG. 20A shows an example of the amplitude characteristic of the focus error signal in the servo controller as the comparative example 1.
Figure 20B:
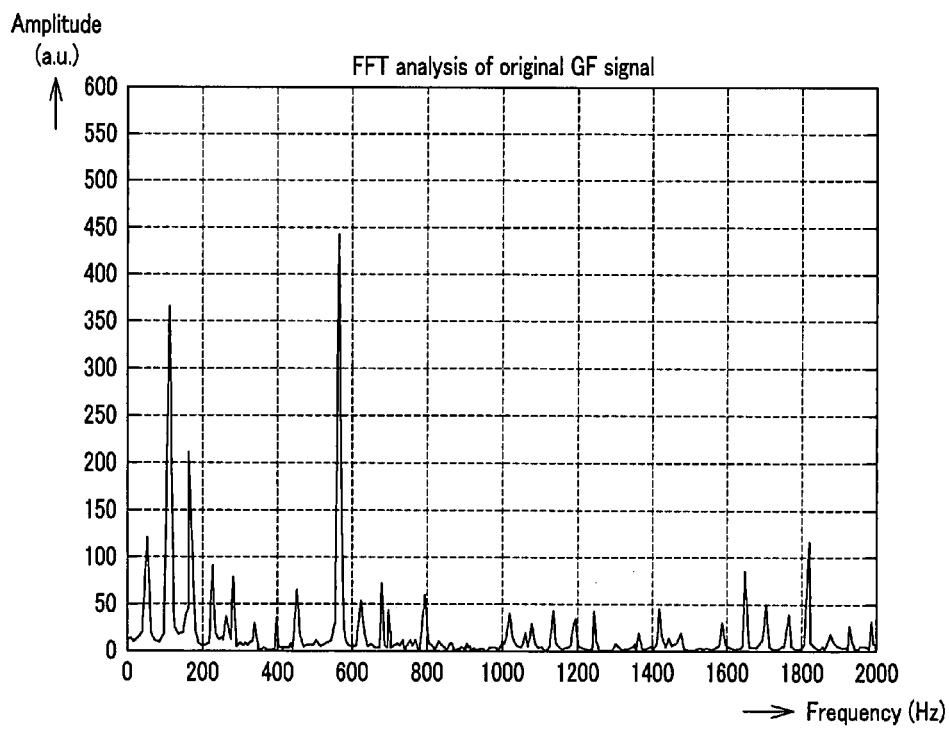
FIG. 20B shows an amplitude characteristic as the result of FFT analysis of the focus error signal shown in FIG. 20A.
Figure 21A:
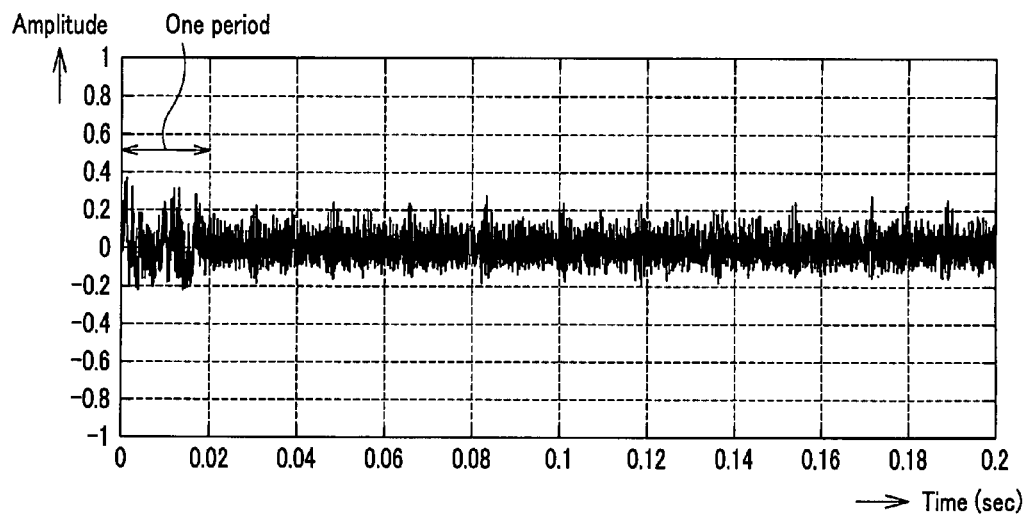
FIG. 21A shows an example of the amplitude characteristic of the focus error signal in the servo controller as the embodiment of the present invention.
Figure 21B:
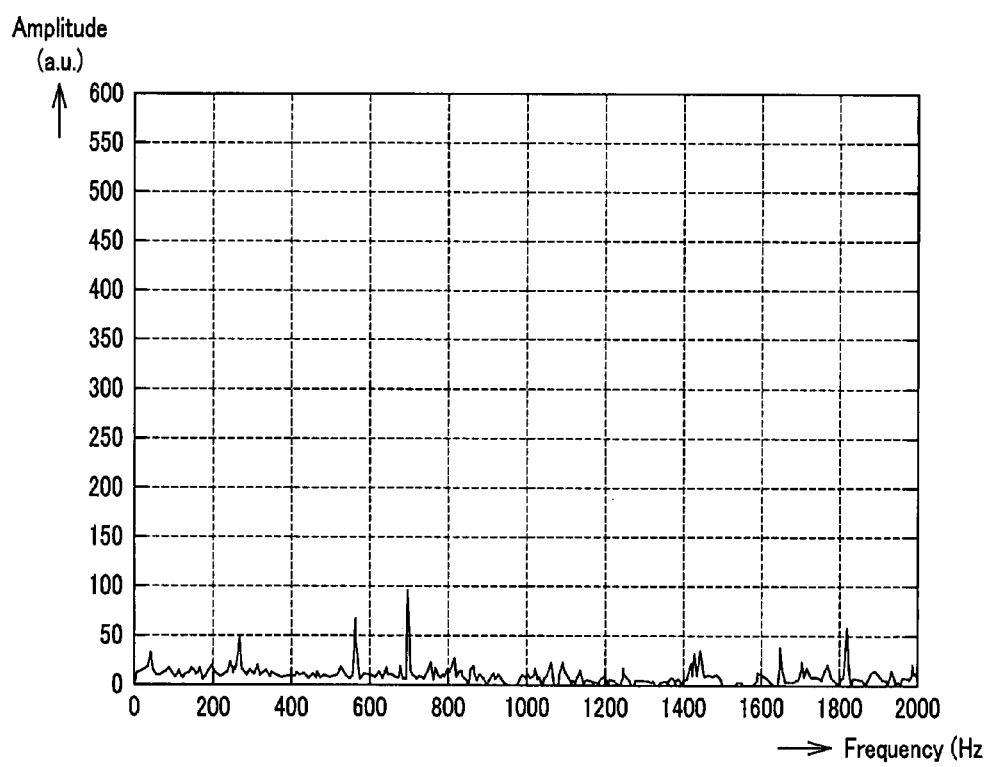
FIG. 21B shows the amplitude characteristic as the result of the FFT analysis of the focus error signal shown in FIG. 21A.

FIG. 20A shows an example of the focus error signal in the servo controller 20 including only the main loop and shown as the comparative example 1 in FIG. 6. FIG. 21A shows a focus error signal when the recursive control unit incorporating an adaptive filter based on ALE according to the present invention is applied to the focus error signal shown in FIG. 20A. Also, FIGS. 20B and 21B show the results of FFT analysis of each focus error signal.

As will be seen in FIGS. 20 and 21, the rotational sync signal (wave of an integral multiple of 58 Hz in frequency in this embodiment) is suppressed. Also, it will be seen that about 70% of the error amplitude is reduced.

Figure 22A:
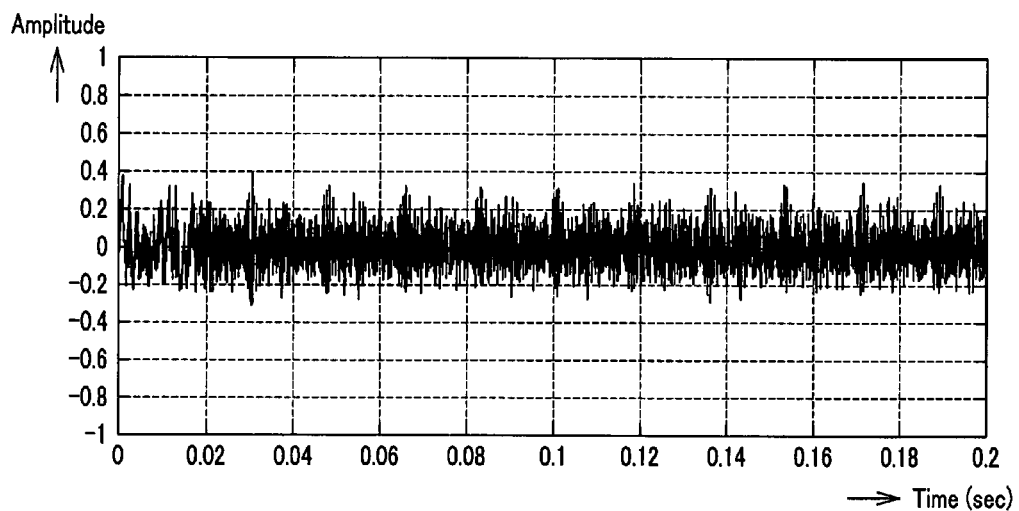
FIG. 22A shows the amplitude characteristic of the focus error signal in case a filter set by trial and error as in the related art is used.
Figure 22B:
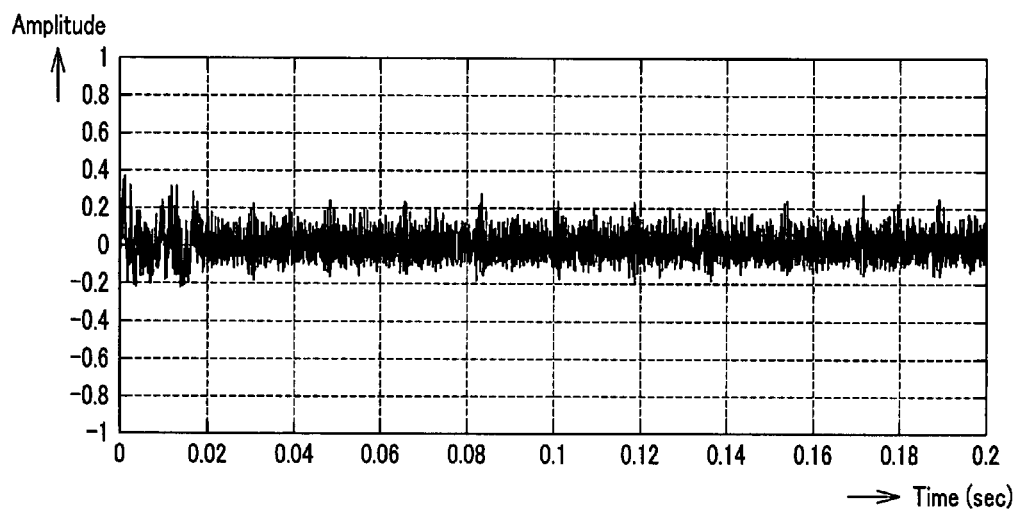
FIG. 22B shows the amplitude characteristic of the focus error signal in the servo controller as the embodiment of the present invention.

FIG. 22A shows a focus error signal in case a filter set by trial and error as in the related art is used. The focus error is an example in case the filter is manually designed to meet the condition B as having been explained above with reference to FIG. 11, for example. FIG. 22B shows a focus error signal in the servo controller 1 shown in FIG. 1. It will be seen by comparison between FIGS. 22A and 22B that the focus error obtained according to the present invention is about 1.5 times better than that in the related art.

Figure 23:
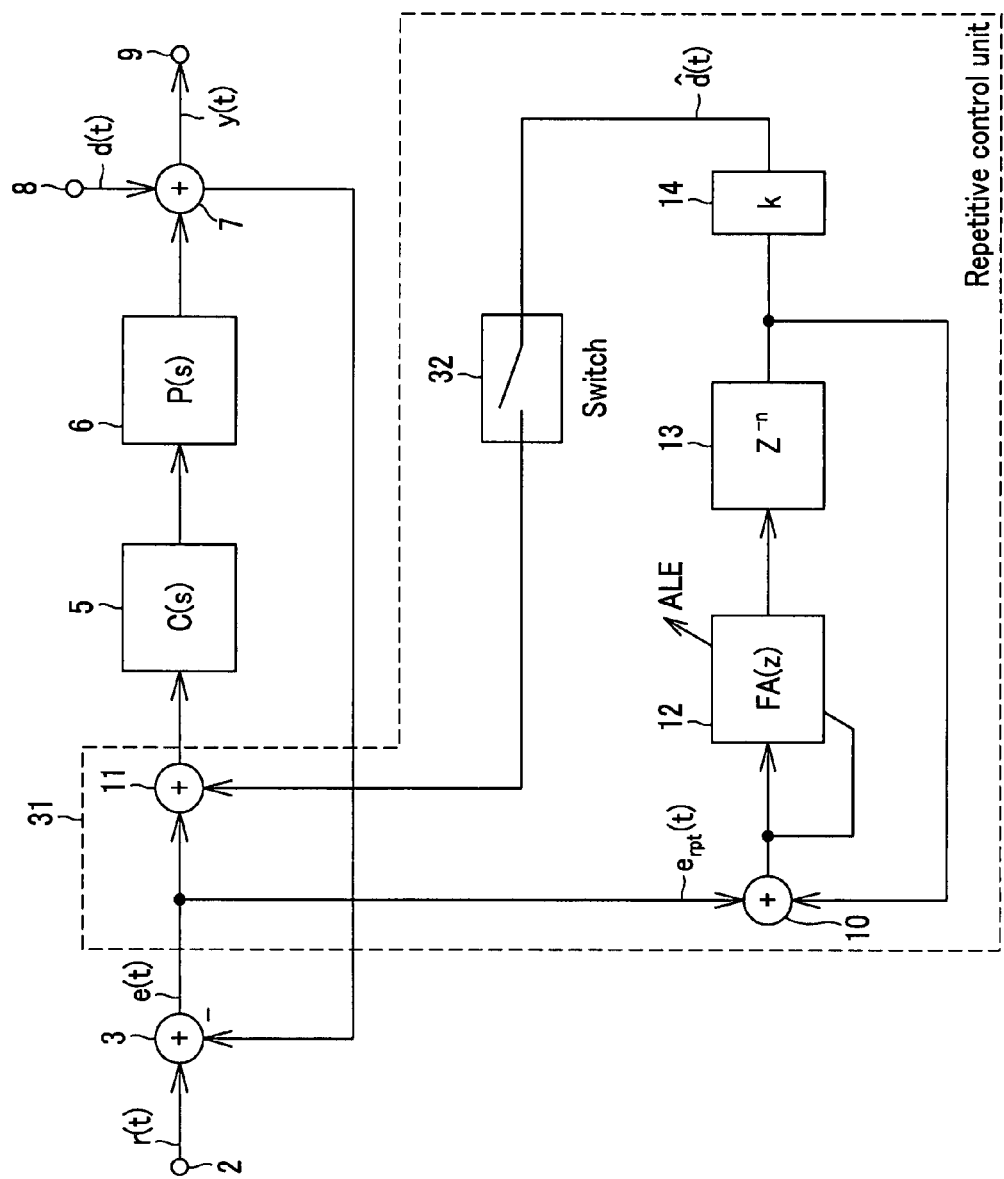
FIG. 23 is a schematic block diagram of a servo controller as a second embodiment of the present invention.

FIG. 23 is a schematic block diagram of a servo controller as a second embodiment of the present invention. This servo controller incorporates a recursive control unit 31 in the main servo system in place of the recursive control unit 4 in the servo controller 1 (first embodiment) shown in FIG. 1. The recursive control unit 31 is a version in which a learning switch 32 is provided between the factor multiplier 14 and adder 11 included in the feed-forward system of the recursive control unit 4.

The recursive control unit 4 in the servo controller 1 shown in FIG. 1 stores the transient-phenomenal state as well. A transient phenomenon will arise in one period shown in FIG. 21A, which will spoil the effect of the present invention. In the servo controller as the second embodiment, the recursive control system is stopped from being connected to the main loop until an adaptive filter output becomes steady, and a second error signal is steadily outputted, and then the learning switch 32 is turned on to connect the recursive control system to the main loop. The point of time when the filter output becomes steady means a time at which the second error signal becomes steady. It also means a time when the servo loop is closed. On the assumption that a loop switch is provided between the subtractor 3 and recursive control unit 31 as shown in FIG. 23, when the loop switch is closed, the learning switch 32 is also closed at the same time.

The servo controller constructed as shown in FIG. 23 will not be influenced by the transient phenomenon and the effect of the present invention will appear starting at the first period.

Also, since the learning switch 32 is closed simultaneously with the servo loop, the servo controller can prevent any oscillation due to addition of the first error signal e(t) and fed-back component in the adder 10.

Figure 24:
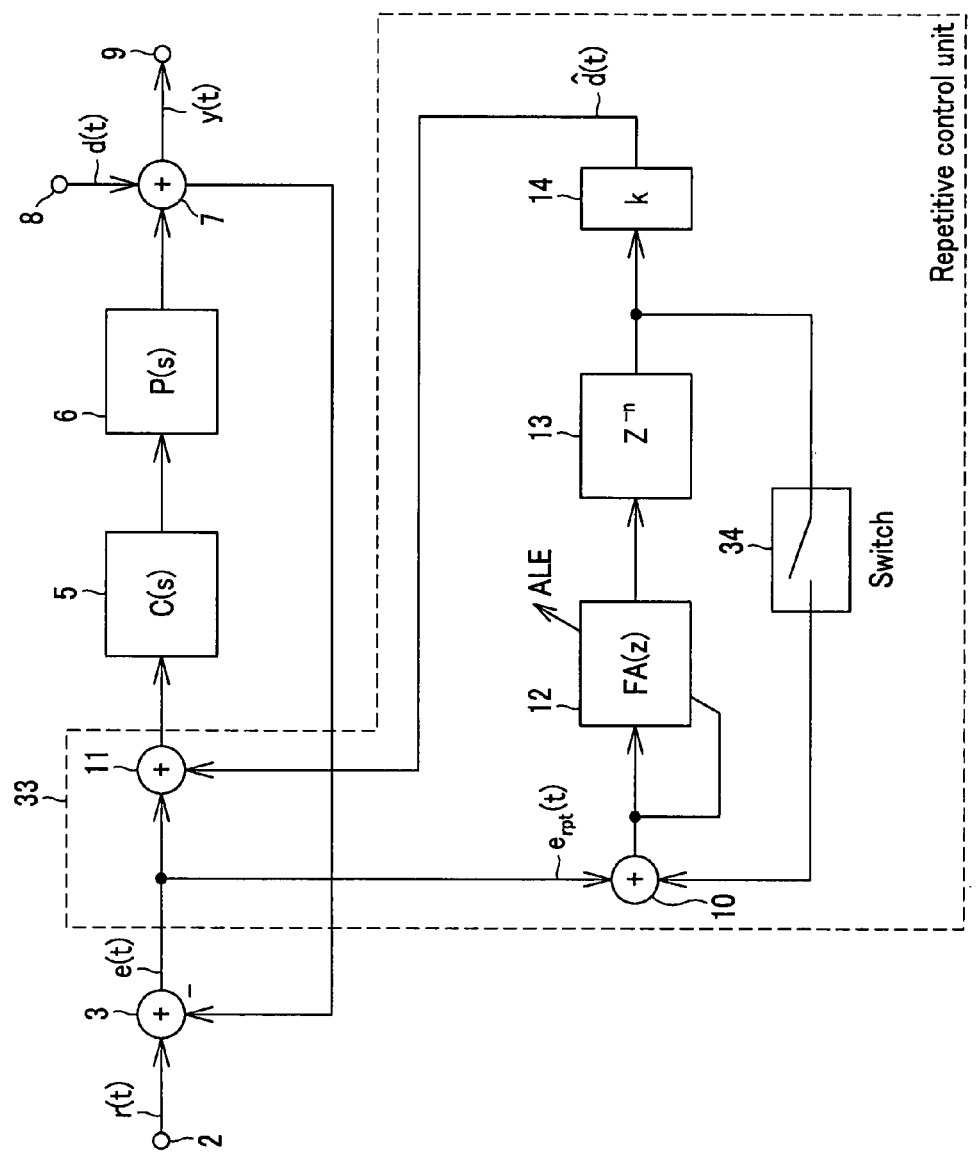
FIG. 24 is also a schematic block diagram of a variant of the servo controller as the second embodiment.

FIG. 24 is a schematic block diagram of a variant of the servo controller as the second embodiment of the present invention. This servo controller includes a learning switch 34 provided in the feedback loop extending from the delay unit 13 to the adder 10 in a recursive control unit 33 in order to eliminate the influence of the transient phenomenon. Also in this variant, the recursive control is stopped from being applied to the main loop until the adaptive filter output becomes steady and the second error signal is steadily outputted, and then the learning switch 34 is turned on to connect the recursive control system to the main loop. The point of time when the filter output becomes steady means a time at which the second error signal becomes steady. It also means a time when the servo loop is closed. On the assumption that a loop switch is provided between the subtractor 3 and recursive control unit 33 as shown in FIG. 24, when the loop switch is closed, the learning switch 34 is also closed at the same time.

This servo controller constructed as shown in FIG. 22 will not be influenced by the transient phenomenon and the effect of the present invention will start appearing first at the first period.

Also, since the learning switch 34 is closed simultaneously with the servo loop, the servo controller can prevent any oscillation due to addition of the first error signal e(t) and fed-back component in the adder 10.

Figure 25:
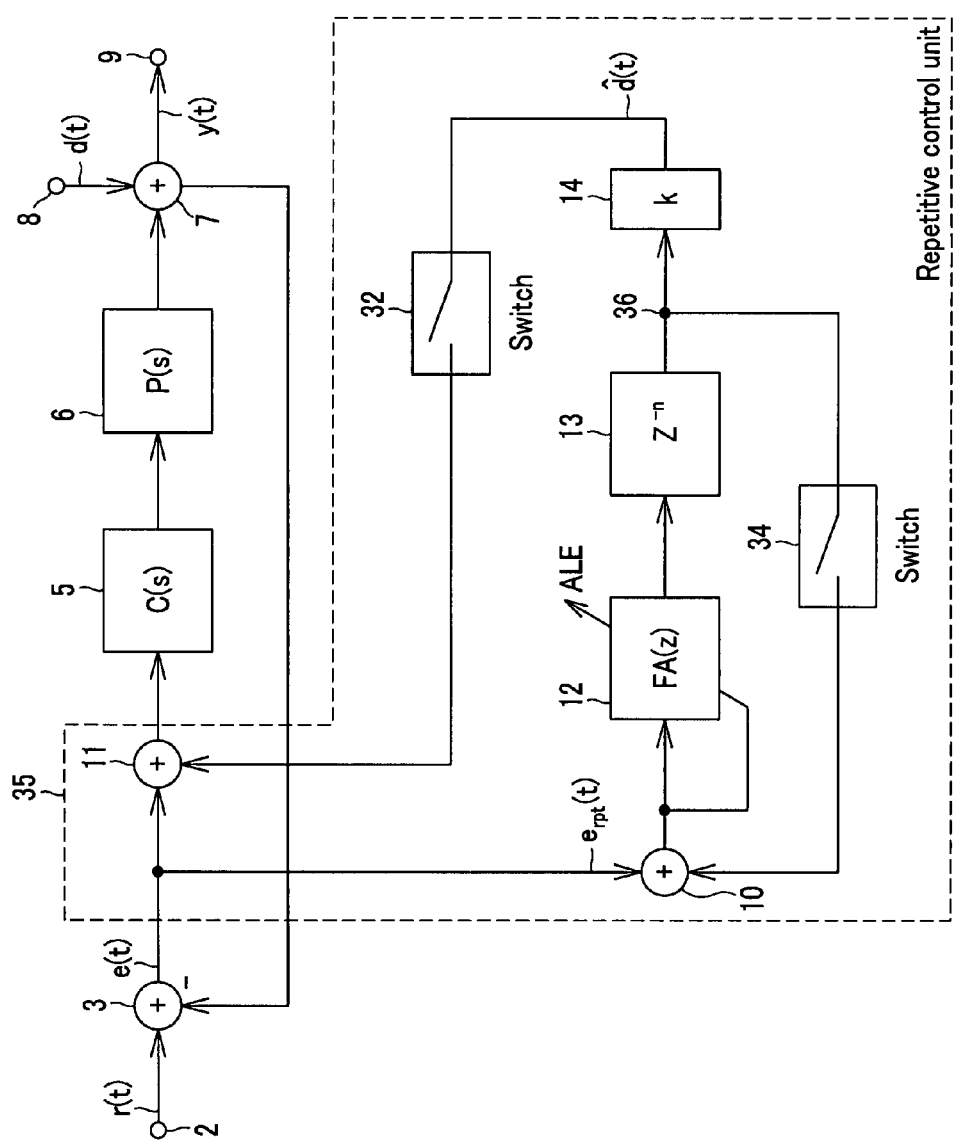
FIG. 25 is a schematic block diagram of a servo controller as a third embodiment of the present invention.

FIG. 25 is a schematic block diagram of a servo controller as a third embodiment of the present invention. This servo controller includes the learning switch 32 provided between the factor multiplier 14 and adder 11 and learning switch 34 provided in the feedback loop extending from the delay unit 13 to the adder 10, both within a recursive control unit 35.

The above servo controller is designed to positively prevent an oscillation from taking place at the adder 10. On the assumption that a loop switch is provided between the adder 3 and recursive control unit 35, the learning switch 34 is first closed simultaneously with the loop switch. Then, the waveform of the second error signal is measured at a point 36. When it is made sure that the waveform becomes stable, that is, the second error signal is steady, it is determined that the learning has stably been done. Then, the learning switch 32 is closed to connect the recursive control unit 35 to the main loop and the disturbance component adaptively produced is added to the first error signal to produce a third error signal.

Therefore, the servo controller as the third embodiment can positively prevent an oscillation from taking place at the adder 10.

Figure 26:
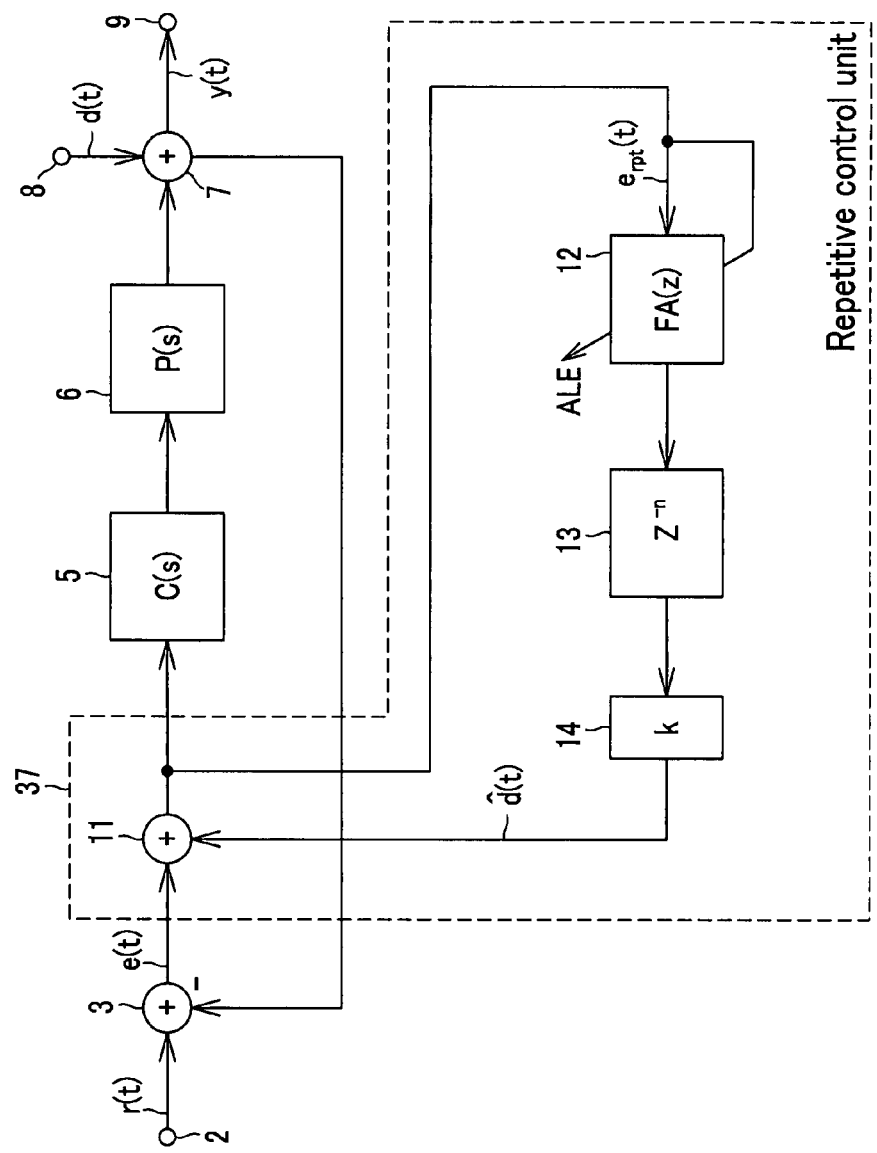
FIG. 26 is a schematic block diagram of a servo controller as a fourth embodiment of the present invention.

FIG. 26 is a schematic block diagram of a servo controller as a fourth embodiment of the present invention. The servo controller has a recursive control unit 37 thereof connected to the main loop.

Using the adaptive line spectrum enhancer or adaptive linear prediction unit, the recursive control unit 37 acquires the second error signal (including mainly a rotational sync signal) resulted from reduction of an irrotational sync component from the first error signal and outputs the third error signal obtained by sequentially updating the first error signal while storing the second error signal in a memory (delay unit) having a capacity for one period, to thereby implement the recursive control of the servo error signal (observation signal).

The recursive control unit 37 is supplied at the adder 11 thereof with the first error signal e(t). Since the adder 11 has been supplied with a fed-forward component (disturbance signal adaptively produced) which will be described in detail later, so the recursive control unit 37 outputs a third error signal resulted from addition of the first error signal and adaptively produced disturbance signal d^(t). The third error signal which is the addition output from the adder 11 is supplied to the controller (C(s)) 5 and supplied to the adaptive filter (FA(z)) 12 in the recursive control unit 37. The adaptive filter (FA(z)) 12 is a major part that works as an adaptive line spectrum enhancer (ALE) or adaptive linear prediction unit on the basis of the delay m and adaptively makes the recursive control. The output (second error signal) from the adaptive filter (FA(z) 12 is supplied to the delay unit ($Z^{-n}$) 13. It is delayed one period in the delay unit ($Z^{-n}$) 13 and then multiplied by a predetermined factor k in the factor multiplier 14 to adaptively produce the disturbance signal d^(t). The disturbance signal d^(t) thus produced adaptively is fed forward to the adder 11.

The adder 11 adds the first error signal which is the subtraction output from the subtractor 3 and the disturbance signal d^(t) adaptively produced, and supplies the addition output as the third error signal to the controller (C(s)) 5. The third error signal is further taken into the recursive control unit 37 and supplied to the adaptive filter (FA(z)) 12.

The controller (C(s)) 5 is connected to the controlled object (P(s)) 6. The controlled object (P(s)) 6 corresponds to a biaxial actuator in an optical disk recorder/player. The output from the controlled object (P(s)) 6 is supplied to the adder 7 which is also supplied with a disturbance signal d(t). The adder 7 adds the disturbance signal d(t) to the output from the controlled object (P(s)) 6 to provide an observation signal y(t) at the output terminal 9 while feeding back the observation signal y(t) to the subtractor 3.

Figure 27:
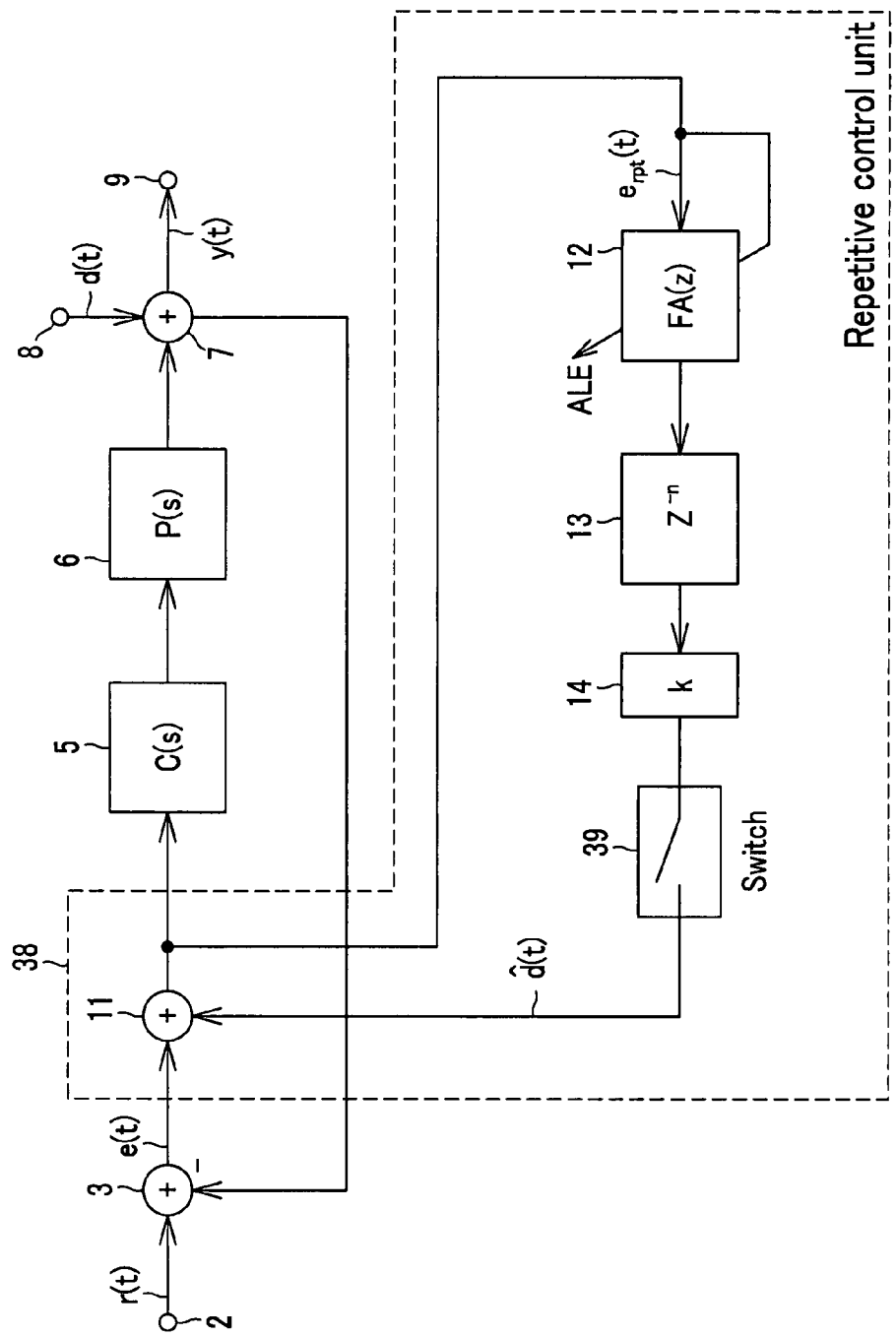
FIG. 27 is a schematic block diagram of a servo controller as a fifth embodiment of the present invention.

FIG. 27 is a schematic block diagram of a servo controller as a fifth embodiment of the present invention. The servo controller has a recursive control unit 38 connected to the main loop. In the recursive control unit 38, a learning switch 39 is provided between the factor multiplier 14 and adder 11 included in the feed-forward system of the recursive control unit 37 shown in FIG. 26.

In the servo controller as the fifth embodiment of the present invention, the recursive control system is stopped from being applied to the main loop until the adaptive filter output becomes steady and the second error signal is steadily outputted, and then the learning switch 39 is turned on to connect the recursive control system to the main loop. The point of time when the filter output becomes steady means a time at which the second error signal becomes steady. It also means a time when the servo loop is closed. On the assumption that a loop switch is provided between the subtractor 3 and recursive control unit 37 as shown in FIG. 27, when the loop switch is closed, the learning switch 39 is also closed at the same time.

The servo controller constructed as shown in FIG. 27 will not be influenced by the transient phenomenon and the effect of the present invention will appear starting at the first period.

As having been described in the foregoing, in the embodiments of the present invention, it is possible to extract a rotational sync signal from an error signal including a rotational async signal by a filter based on the adaptive line spectrum enhancer or adaptive linear prediction unit. Also, the filter can automatically be set adaptively correspondingly to an input error signal. Thus, since the filter is not set artificially, it is possible to design a filter having a constant quality and not depending upon the designer of the filter. Also, the recursive control in which the filter output is stored for a period of one rotation and fed forward can be incorporated in the main loop to suppress the rotational sync component of the error signal.

Further, according to possible other embodiments, it is possible to prevent the servo controller from being influenced by any transient response since the recursive control output is applied to the main loop after the adaptive filter output and recursive control output have become steady.

Figure 28:
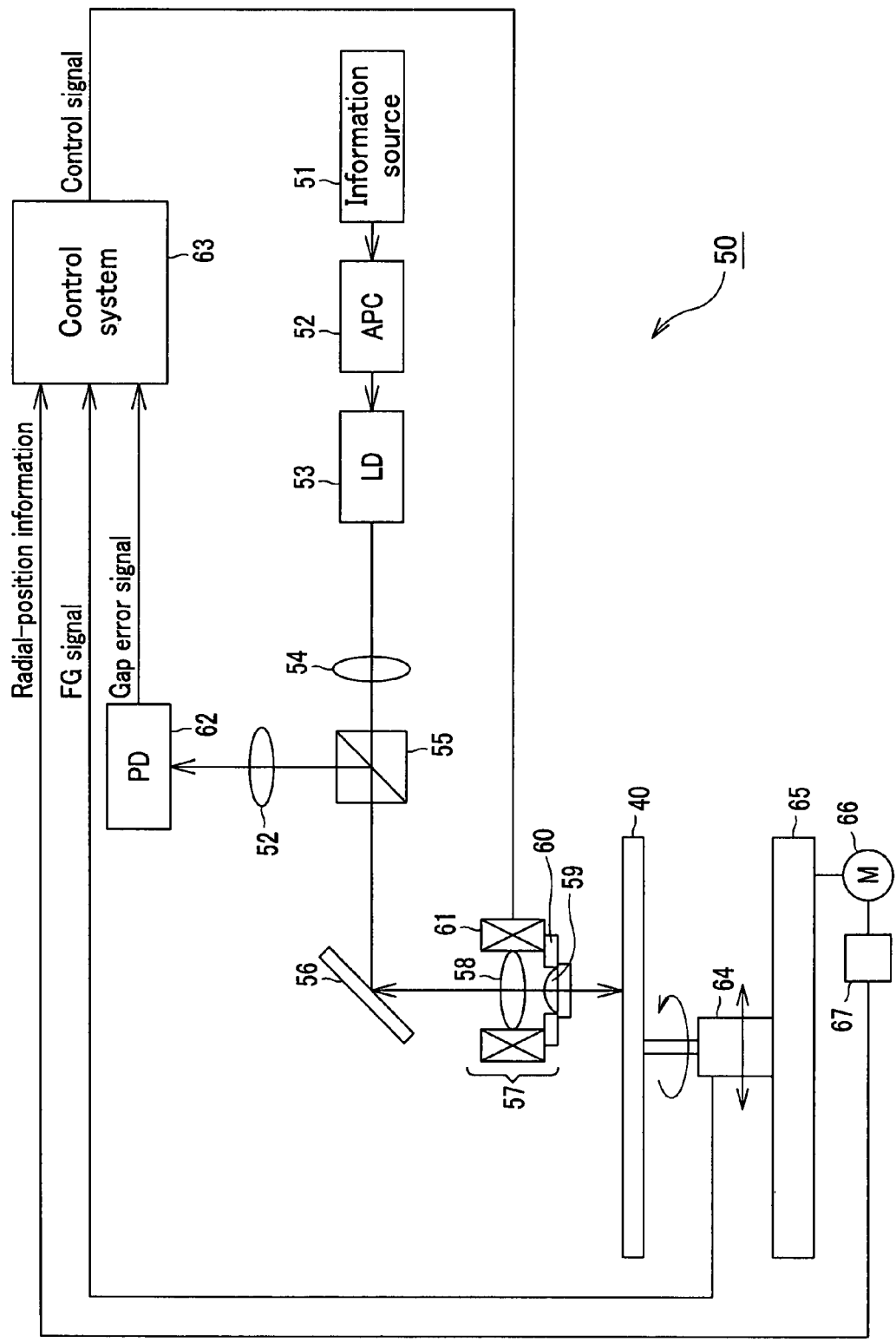
FIG. 28 is a schematic block diagram of an optical disk recorder.

Next, there will be explained an optical disk recorder/player in which the servo controller is applied to a control system for a gap servo of a biaxial actuator (concrete example of the controlled object (P(s)) 6 shown in FIG. 1 and other) in an optical head used in a near field. In the optical disk recorder/player, generally indicated with a reference numeral 50 in FIG. 28, a removable disk-shaped recording medium (will be referred to as "optical disk" hereunder) 40 is set in a disk mount (not shown) and information is recorded to the optical disk 40 thus set by irradiating evanescent light detectable in a near field to the optical disk 40.

The optical disk recorder/player 50 includes an information source 51 that supplies information to be recorded to the optical disk 40, APC (Auto Power Controller) 52, laser diode (LD) 53, collimator lens 54, beam splitter (BS) 55, mirror 56, optical head 57, condenser lens 68, photodetector (PD) 62, spindle motor 64, feed bar 65, feed motor 66, potentiometer 67 and a control system (to which the servo controller 1 shown in FIG. 1 is applied) 63.

APC 2 modulates laser light emitted from the laser diode 53 provided downstream of APC 2 correspondingly to information supplied from the information source 51.

The laser diode 53 emits laser light having a predetermined wavelength correspondingly to the control by APC 52. For example, the laser diode 53 is a red semiconductor laser, blue semiconductor laser or the like.

The collimator lens 54 collimates the laser light emitted from the laser diode 53 into a parallel light beam.

The beam splitter 55 is to allow the light beam emitted from the collimator lens 54 to pass by for projection to the mirror 56. Also, the beam splitter 55 reflects, toward the condenser lens 68, return light reflected by the mirror 56 and coming from the optical head 57.

The mirror 56 reflects, toward the optical head 57, the light beam coming from the beam splitter 55. Also, the mirror 56 reflects, toward the beam splitter 55, the return light from the optical head 57.

The optical head 57 focuses the light beam coming from the mirror 56 for irradiation to the information recording surface of the optical disk 40. The light to be irradiated by the optical head 57 to the information recording surface is evanescent light having a spot size larger than the light of diffraction of a lens and with which information can be written or read.

Figure 29:
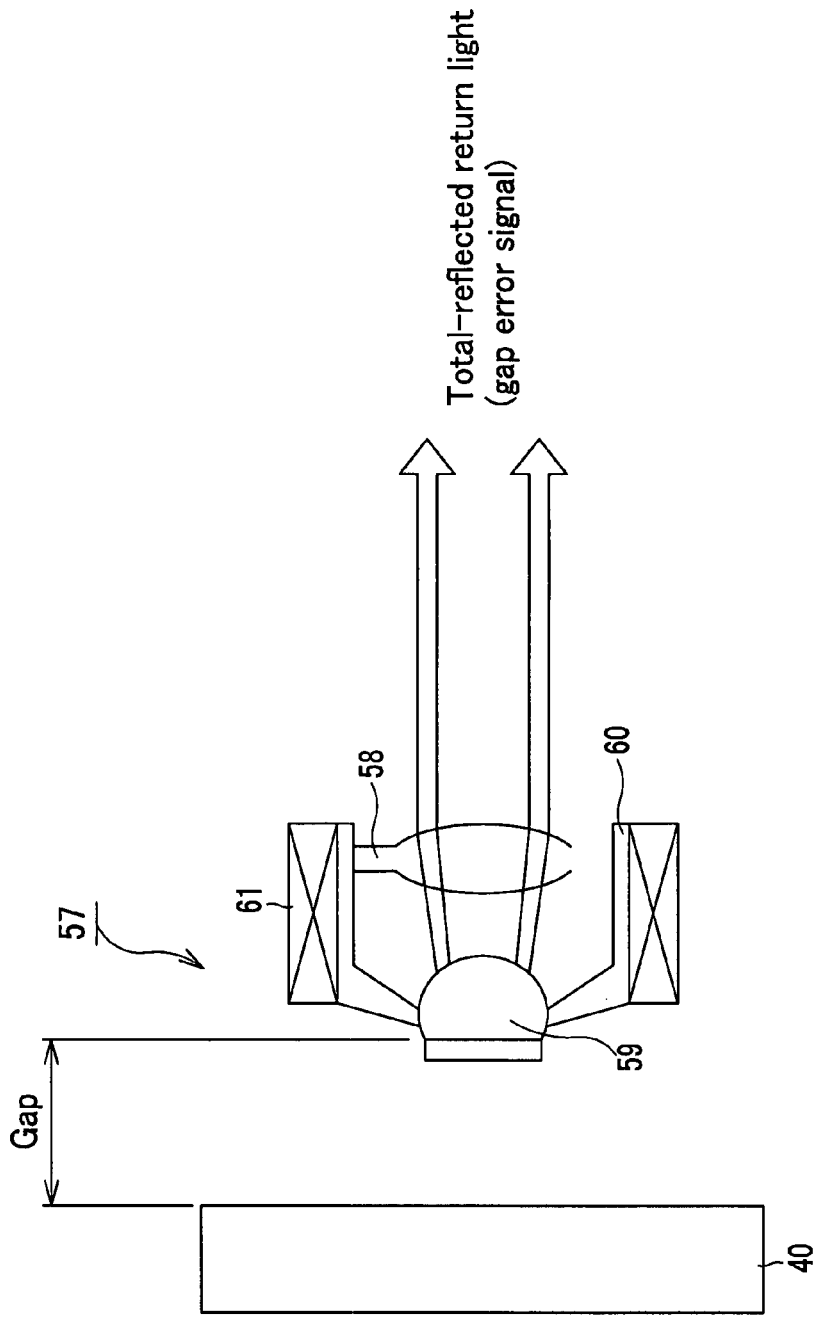
FIG. 29 schematically illustrates an optical head.

As shown in FIG. 29, the optical head 57 includes an objective lens 58, SIL (Solid Immersion Lens) 59, lens holder 60 and actuator 61.

The objective lens 58 focuses, onto SIL 59, the light beam emitted from the laser diode 53 and incident thereupon via the collimator lens 54, beam splitter 55 and mirror 56.

SIL 59 is a lens having a high refractive index and formed by cutting a spherical lens so that a part of the lens is flat. SIL 59 receives, at the spherical side thereof, the light beam having passed by the objective lens 58 and condenses the light beam onto the central portion of the side opposite to the spherical side.

Also, SIM (Solid Immersion Mirror) having a reflecting mirror formed thereon to have the same function as SIL 59 may be used in place of SIL 59.

The lens holder 60 holds the objective lens 58 and SIL 59 together in a predetermined physical relation between them. SIL 59 is held by the lens holder 60 so that its spherical side will face the objective lens 58 and its side (end face) opposite to the spherical side will face the information recording surface of the optical disk 40.

By positioning SIL 59 having the high refractive index between the objective lens 58 and information recording surface of the optical disk 40 by means of the lens holder 60 as above, a larger numerical aperture than that of the objective lens 58 itself can be provided. Since the spot size of the light beam is generally in inverse proportion to the numerical aperture of the lens, a light beam coming from a lens can be limited by the objective lens 58 and SIL 59 to have a smaller spot size.

The actuator 61 moves the lens holder 60 in a focusing direction and/or tracking direction correspondingly to a control current supplied as a control signal from the control system 63.

In the optical head 57, the evanescent light is a part, oozing from a reflection boundary surface, of a light beam incident upon the end face of SIL 59 at an angle larger than the critical angle and totally reflected. In case the end face of SIL 59 is within a near field, which will be described in detail later, from the information recording surface of the optical disk 40, the evanescent light having oozed from the end face of SIL 59 will be projected onto the information recording surface.

Next, the near field will be explained. Generally, the near field is a field in which the distance d from the light beam-outgoing surface of a lens is up to $d \leq \lambda/2$ where $\lambda$ is a wavelength of light incident upon the lens.

Concerning the optical head 57 and optical disk 40 shown in FIG. 29, a field, in which a distance (gap) d from the end face of SIL 59 of the optical head 57 to the information recording surface of the optical disk 40 is defined as $d \leq \lambda/2$ where $\lambda$ is a wavelength of a light beam incident upon SIL 59, is called a "near field". A condition, in which the gap d between the information recording surface of the optical disk 40 and end face of SIL 59 meets the relation $d \leq \lambda/2$ and the evanescent light oozing from the end face of SIL 59 to the information recording surface of the optical disk 40, is called a "near-field condition", while a condition, in which the gap d meets a relation $d > \lambda/2$ and the evanescent light does not ooze to the information recording surface, is called a "far-field condition".

Figure 30:
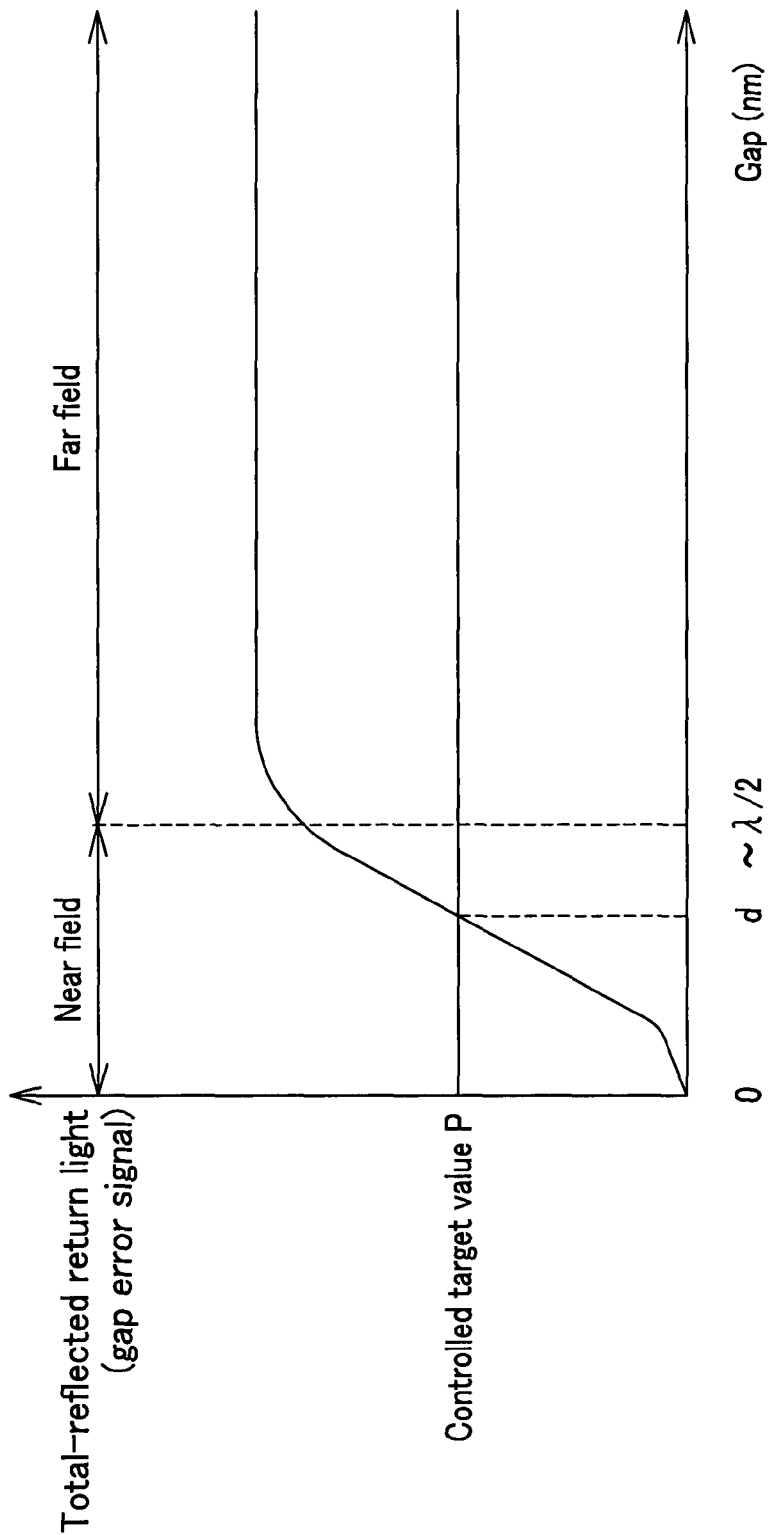
FIG. 30 shows a relation between the return light resulted from total reflection and a gap between the optical head in a near field and information recording surface of the optical disk.

Note that in a far-field condition, a light beam incident upon the end face of SIL 59 at an angle larger than the critical angle is totally reflected as return light. Therefore, the total-reflection return light in the far-field condition as shown in FIG. 30 will be constant in value.

On the other hand, in a near-field condition, a part of a light beam incident upon the end face of SIL 59 at an angle larger than the critical angle will ooze as evanescent light at the end face of SIL 59, that is, at the reflection boundary face, to the information recording surface of the optical disk 40. Therefore, the amount of total-reflection return light of a light beam totally reflected as shown in FIG. 30 will be smaller than in a far-field condition. Also, it will be seen that the amount of total-reflection return light in the near-field condition will be exponentially smaller in a position nearer to the information recording surface of the optical disk 40.

Therefore, in case the end face of SIL 59 is in a near-field condition, servo control can be made with a linear portion, in which the amount of total-reflection return light changes correspondingly to a gap length, being taken as a gap error signal to control, to a fixed value, the gap between the end face of SIL 59 and information recording surface of the optical disk 40. For example, by making such control that the total-reflection return light will have a controlled target value P, the gap will constantly be kept as a distance d.

The construction of an optical disk recorder 50 shown in FIG. 28 will be explained again. The condenser lens 68 condenses, onto the photodetector 62, return light totally reflected at the end face of SIL 59 of the optical head 57, reflected by the mirror 56 and reflected by the beam splitter 55.

The photodetector 62 detects the light amount of the return light condensed by the condenser lens 68 in the form of a current value. It should be noted that the current detected by the photodetector 62 has already been converted into a DC current and is supplied as a voltage corresponding to the total-reflection return light amount to the control system 63.

The spindle motor 64 is provided with an encoder (not shown) that generates a fixed number of pulse signals called "FG signal" while the spindle motor 64 is being rotated one turn. By counting the FG signals generated by the encoder (not shown), it is possible to know to which circumferential position on the information recording surface of the optical disk 40 a light beam is currently being irradiated from the optical head 57.

The FG signal output from the encoder (not shown) provided on the spindle motor 64 indicates in which circumferential position on the optical disk 40 the optical head 57 is staying. The FG signal output from the encoder (not shown) is supplied to the control system 63.

The feed bar 65 has mounted thereon the spindle motor 64 which is a rotation drive system to move the optical disk 40 set in a disk mount (not shown) radially. The feed bar 65 is moved by the feed motor 66 radially of the optical disk 40. As the feed bar 65 is moved by the feed motor 66, the optical head 57 can be moved from one track to another on the optical disk 40.

The potentiometer 67 is installed on the feed motor 66. By detecting, by the potentiometer 67, an angle through which the feed bar 65 has been rotated, it is possible to know how long the feed bar 65 has moved. The movement of the feed bar 65 is relatively the same as the radial movement of the optical head 57 on the optical disk 40. Therefore, it is possible to know the radial position of the optical head 57 on the optical disk 40 on the base of a distance detected by the potentiometer 67.

The value detected by the potentiometer 67 is taken as radial-position information indicating in which radial position on the optical disk 40 the optical head 57 is. The radial-position information from the potentiometer 67 is supplied to the control system 63.

The control system 63 incorporates the servo controller 1 to control the gap between the information recording surface of the optical disk 40 and SIL 59 of the optical head 57.

The optical disk 40 used in the optical disk recorder 50 is a removable recording medium. Therefore, in comparison with a recording medium used being previously fixed in a disk rotation drive mechanism of an optical disk recorder, the optical disk 40 cannot be set in the disk rotation drive mechanism with any high precision. Therefore, it is difficult to suppress the axial runout of the optical disk 40 being set and rotated in the disk rotation drive mechanism.

The control system 63 incorporating the servo controller 1 makes servo control mainly by determining a controlled variable for the biaxial actuator for the optical head 57 to follow a disturbance caused by an axial runout. As having been described above, the servo controller 1 includes the recursive control unit 4 and works as an adaptive line spectrum enhancer or adaptive linear prediction unit to obtain an error signal (including mainly a rotational sync signal) resulted from reduction of an irrotational sync signal from a servo error signal and sequentially update the error signal while storing the error signal in a memory having a capacity for one period, for thereby controlling the servo error signal recursively.

Therefore, the optical disks recorder 50 can make servo control with a constant quality.

Of course, the control system 63 may incorporate one of the servo controllers as other embodiments shown in FIGS. 23 to 27 in place of the servo controller 1. In this case, the optical disk recorder 50 can make quicker gap servo without being influenced by any transient phenomenon. Also, by closing the learning switch simultaneously with the servo loop, it is possible to suppress the oscillation.

As having been described in the foregoing, the servo controlling apparatus and method according to the present invention can automatically set a multiplication factor etc. intended for stabilizing the closed loop adaptively to meet the safety conditions. Also, the apparatus and method according to the present invention can make high-precision servo control.

The optical disk recording or playback apparatus according to the present invention can record or reproduce information signals to or from a disk-shaped recording medium by making servo control with a constant quality.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

The present invention is applicable to a recursive control method using the adaptive line spectrum enhancer (ALE) and adaptive linear prediction unit and also to an optical disk drive and optical-disk servo control method using the recursive control method. Also, the present invention permits to automatically design a low-pass filter adaptively to a servo error signal.

The invention claimed is:

1. A servo control apparatus comprising:
a recursive control unit that determines a first error signal on the basis of a target signal and a signal of observation of a controlled object having a disturbance applied thereto, makes adaptive line spectrum enhancement or adaptive linear prediction of the first error signal to provide a second error signal, delays the second error signal by one period to provide a delayed second error signal, generates an adaptive disturbance signal by recursive control using the delayed second error signal and outputs a third error signal resulted from addition of the adaptive disturbance signal thus generated to the first error signal,
the recursive control unit controlling a servo mechanism which is the controlled object on the basis of the third error signal resulted from the recursive control.

2. The servo control apparatus according to claim 1, further comprising a control unit that determines a controlled variable of the controlled object on the basis of the third error signal from the recursive control unit.

3. The servo control apparatus according to claim 1, wherein the recursive control unit includes:
a first error signal detector that determines the first error signal based at least in part on the target signal and the signal of observation;

an adaptive filter unit that makes the adaptive line spectrum enhancement or adaptive linear prediction of the first error signal detected by the first error signal detector to provide the second error signal;

a delay unit that delays the second error signal from the adaptive filter by one period to provide the delayed second error signal;

a feed-back unit that feeds the second error signal taken out of the delay unit back for addition to the first error signal; and a feed-forward unit that generates the adaptive disturbance signal from the second error signal taken out of the delay unit and feeds the adaptive disturbance signal forward for addition to the first error signal to provide the third error signal.

4. The servo control apparatus according to claim 3, wherein the adaptive filter unit in the recursive control unit includes:

delay units of delay order m; and an adaptive filter that functions as an adaptive line spectrum enhancer or adaptive linear prediction unit based at least in part on the delay order m.

5. The servo control apparatus according to claim 4, wherein the adaptive filter in the adaptive filter unit determines a multiplication factor adaptively on the basis of a fifth error signal which a difference between the first error signal and a fourth error signal delayed by the delay unit of the delay order m and filtered by the adaptive filter.

6. The servo control apparatus according to claim 4, wherein the adaptive filter is of an FIR filter.

7. The servo controller according to claim 4, wherein the adaptive filter is of a IIR filter.

8. The servo control apparatus according to claim 3, wherein the recursive control unit makes recursive control after the second error signal becomes steady.

9. The servo control apparatus according to claim 1, wherein the recursive control unit includes:

a first error signal detector that determines the first error signal based at least in part on the target signal and the signal of observation;

an adaptive filter unit that makes the adaptive line spectrum enhancement or adaptive linear prediction of the first error signal detected by the first error signal detector to provide the second error signal;

a delay unit that delays the second error signal from the adaptive filter by one period to provide the delayed second error signal; and a feed-forward unit that generates an adaptive disturbance signal from the second error signal taken out of the delay unit and feeds the adaptive disturbance signal forward for addition to the first error signal to provide the third error signal.

10. The servo control apparatus according to claim 9, wherein the adaptive filter unit in the recursive control unit includes:

delay units of delay order m; and an adaptive filter that functions as an adaptive line spectrum enhancer or adaptive linear prediction unit on the basis of the delay order m.

11. The servo control apparatus according to claim 10, wherein the adaptive filter in the adaptive filter unit determines a multiplication factor adaptively based at least in part on a fifth error signal which a difference between the first error signal and a fourth error signal delayed by the delay unit of the delay order m and filtered by the adaptive filter.

12. The servo control apparatus according to claim 10, wherein the adaptive filter is of an FIR filter.

13. The servo control apparatus according to claim 10, wherein the adaptive filter is of a IIR filter.

14. The servo control apparatus according to claim 9, wherein the repetitive control unit makes repetitive control after the second error signal becomes steady.

15. A servo control method comprising:

determining a first error signal on the basis of a target signal and a signal of observation of a controlled object having a disturbance applied thereto;

making adaptive line spectrum enhancement or adaptive linear prediction of the first error signal to provide a second error signal;

delaying the second error signal by one period and then feeding back the delayed second error signal for addition to the first error signal; and generating an adaptive disturbance signal from the second error signal delayed by the one period and feeding forward the adaptive disturbance signal for addition to the first error signal to output a third error signal, controlling a servo mechanism based at least in part on the third error signal.

16. The servo control method according to claim 15, further comprising determining a controlled variable of the controlled object based at least in part on the third error signal.

* * * * *